US009971981B2

(12) United States Patent
Crane, Jr. et al.

(10) Patent No.: US 9,971,981 B2
(45) Date of Patent: May 15, 2018

(54) SUPPLY CHAIN MANAGEMENT SYSTEM

(71) Applicant: IndustryStar, LLC, Ann Arbor, MI (US)

(72) Inventors: William J. Crane, Jr., Ann Arbor, MI (US); Matthew William Forster, Farmington Hills, MI (US); Kenneth Alan Nelson, Ann Arbor, MI (US)

(73) Assignee: INDUSTRYSTAR, LLC., Ann Arbor, MI (US)

( * ) Notice: Subject to any disclaimer, the term of this patent is extended or adjusted under 35 U.S.C. 154(b) by 297 days.

(21) Appl. No.: 14/738,594

(22) Filed: Jun. 12, 2015

(65) Prior Publication Data
US 2015/0363730 A1 Dec. 17, 2015

Related U.S. Application Data

(60) Provisional application No. 62/011,942, filed on Jun. 13, 2014.

(51) Int. Cl.
G06Q 10/00 (2012.01)
G06Q 10/06 (2012.01)

(52) U.S. Cl.
CPC .............. G06Q 10/06315 (2013.01)

(58) Field of Classification Search
CPC .......................................... G06Q 10/00–50/00
USPC .................................... 705/7.11–7.42
See application file for complete search history.

(56) References Cited

U.S. PATENT DOCUMENTS 8,279,067 B2* 10/2012 Berger ................. G06Q 10/08 340/539.13
8,473,354 B2* 6/2013 Psota .................. G06Q 10/083 705/26.1
8,798,963 B2* 8/2014 Carpenter ............ G01V 5/0083 378/57
2002/0188496 A1 12/2002 Feldman et al.
2003/0033179 A1* 2/2003 Katz .................... G06Q 10/063 705/7.12

(Continued)

OTHER PUBLICATIONS

Tomlin, Brian. "On the value of mitigation and contingency strategies for managing supply chain disruption risks." Management Science 52.5 (2006): 639-657.*
Jüttner, Uta, Helen Peck, and Martin Christopher. "Supply chain risk management: outlining an agenda for future research." International Journal of Logistics: Research and Applications 6.4 (2003): 197-210.*

(Continued)

Primary Examiner — Alan S Miller
(74) Attorney, Agent, or Firm — Foley & Lardner LLP

(57) ABSTRACT

An illustrative method for managing a supply chain is performed by a supply chain management server. The method comprises receiving information related to operations of a first supplier. The first supplier is responsible for providing a first product that satisfies criteria of a buyer. The method further includes determining a risk value that indicates a risk level of disruption of the operations of the first supplier and flagging the first supplier within a database of potential suppliers in response to determining that the determined risk value is greater than a risk tolerance threshold. The method also comprises notifying the buyer that the first supplier has been flagged and providing a list of recommended suppliers to the buyer. The recommended suppliers are each capable of providing a respective second product to the buyer. Each of the respective second products satisfies the criteria of the buyer.

20 Claims, 19 Drawing Sheets

(56) References Cited

U.S. PATENT DOCUMENTS

| | | | | |
|---|---|---|---|---|
| 2005/0049892 | A1* | 3/2005 | Miller | G06Q 10/06 705/4 |
| 2005/0096955 | A1* | 5/2005 | Sorensen | G06Q 10/06 705/26.4 |
| 2009/0144070 | A1* | 6/2009 | Psota | G06Q 10/083 705/330 |
| 2009/0187482 | A1* | 7/2009 | Blount | G06Q 30/0207 705/14.1 |
| 2009/0248488 | A1* | 10/2009 | Shah | G06Q 10/0635 705/7.28 |
| 2009/0322510 | A1* | 12/2009 | Berger | G06Q 10/08 340/539.1 |
| 2011/0251868 | A1* | 10/2011 | Mikurak | G06Q 10/06 705/7.25 |
| 2014/0074668 | A1* | 3/2014 | Gomez | G06Q 10/08 705/28 |
| 2014/0156513 | A1* | 6/2014 | Psota | G06Q 30/02 705/39 |

OTHER PUBLICATIONS

Kleindorfer, Paul R., and Germaine H. Saad. "Managing disruption risks in supply chains." Production and operations management 14.1 (2005): 53-68.*

Tang, Christopher S. "Robust strategies for mitigating supply chain disruptions." International Journal of Logistics: Research and Applications 9.1 (2006): 33-45.*

Pochard, Sophie. Managing risks of supply-chain disruptions: dual sourcing as a real option. Diss. Massachusetts Institute of Technology, 2003.*

Elkins, Debra, et al. "18 ways to guard against disruption." management 1.1 (2005): 10-11.*

Giannakis, Mihalis, and Michalis Louis. "A multi-agent based framework for supply chain risk management." Journal of Purchasing and Supply Management 17.1 (2011): 23-31.*

International Search Report and Opinion regarding PCT/US15/35673 dated Sep. 11, 2015.

Supplemental European Search Report re Application No. 15807061.5; 8 pages.

* cited by examiner

FIG. 5E

SUPPLY CHAIN MANAGEMENT SYSTEM

CROSS-REFERENCE TO RELATED APPLICATIONS

This application claims priority to and the benefit of U.S. Provisional Patent Application No. 62/011,942, filed on Jun. 13, 2014, which is incorporated herein by reference in its entirety.

FIELD

The present disclosure relates generally to the field of supply chain management. More particularly, the present disclosure relates to predictive analytics for use in determining supply chain disruption, predictive analytics for use in matching buyers and suppliers, and crowd-sourced user ratings.

BACKGROUND

The following description is provided to assist the understanding of the reader. None of the information provided or references cited is admitted to be prior art. Some manufacturers rely on products from suppliers in their production. Manufacturers often employ regimented schedules that are planned carefully. Thus, when a supplier fails to provide products to a manufacturer, the manufacturer's product can be stalled, thereby costing the manufacturer time and money and potentially delaying shipments to its customers. Thus, a system that can predict when a supplier might fail to deliver its product may be helpful. Also, a system that can help identify the best alternative supplier may be helpful.

SUMMARY

An illustrative method for managing a supply chain is performed by a supply chain management server. The method comprises receiving information related to operations of a first supplier. The first supplier is responsible for providing a first product that satisfies criteria of a buyer. The method further includes determining a risk value that indicates a risk level of disruption of the operations of the first supplier and flagging the first supplier within a database of potential suppliers in response to determining that the determined risk value is greater than a risk tolerance threshold. The method also comprises notifying the buyer that the first supplier has been flagged and providing a list of recommended suppliers to the buyer. The recommended suppliers are each capable of providing a respective second product to the buyer. Each of the respective second products satisfies the criteria of the buyer.

An illustrative system for managing a supply chain comprises a communications transceiver, a memory and a processor. The communications transceiver is configured to communicate with a plurality of buyers and a plurality of suppliers. The memory is configured to store a database of information, a database of disruption event information, and a database of the plurality of suppliers. The information relates to operations of a first supplier. The first supplier is responsible for providing a first product that satisfies criteria of a buyer. The disruption event information comprises information indicating disruption of the operations of the first supplier of the plurality of suppliers. The processor is operatively coupled to the communications transceiver and the memory. The processor is configured to receive the information, receive the disruption event information, and determine a risk value that indicates a risk level of disruption of the operations of the first supplier based on the disruption event information. The processor is further configured to flag the first supplier within the database of the plurality of suppliers in response to determining that the determined risk value is greater than a risk tolerance threshold, notify, via the communications transceiver, the buyer that the first supplier has been flagged, and provide, via the communications transceiver, a list of recommended suppliers to the buyer. The recommended suppliers are each capable of providing a respective second product to the buyer. Each of the respective second products satisfies the criteria of the buyer.

An illustrative non-transitory computer-readable medium includes computer-readable instructions that, upon execution by a processor, cause a device to perform operations. The operations include receiving information related to operations of a first supplier. The first supplier is responsible for providing a first product that satisfies criteria of a buyer. The operations further include determining a risk value that indicates the risk of disruption of the operations of the first supplier and flagging the first supplier within a database of potential suppliers in response to determining that the determined risk value is greater than a risk tolerance threshold. The operations also include notifying the first supplier that the first supplier has been flagged and providing a list of recommended suppliers to the buyer. The recommended suppliers are each capable of providing a respective second product to the buyer. Each of the respective second products satisfy the criteria of the buyer.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 5E is an illustration of a display of a company's financial information in accordance with an illustrative embodiment.

Figure 1:
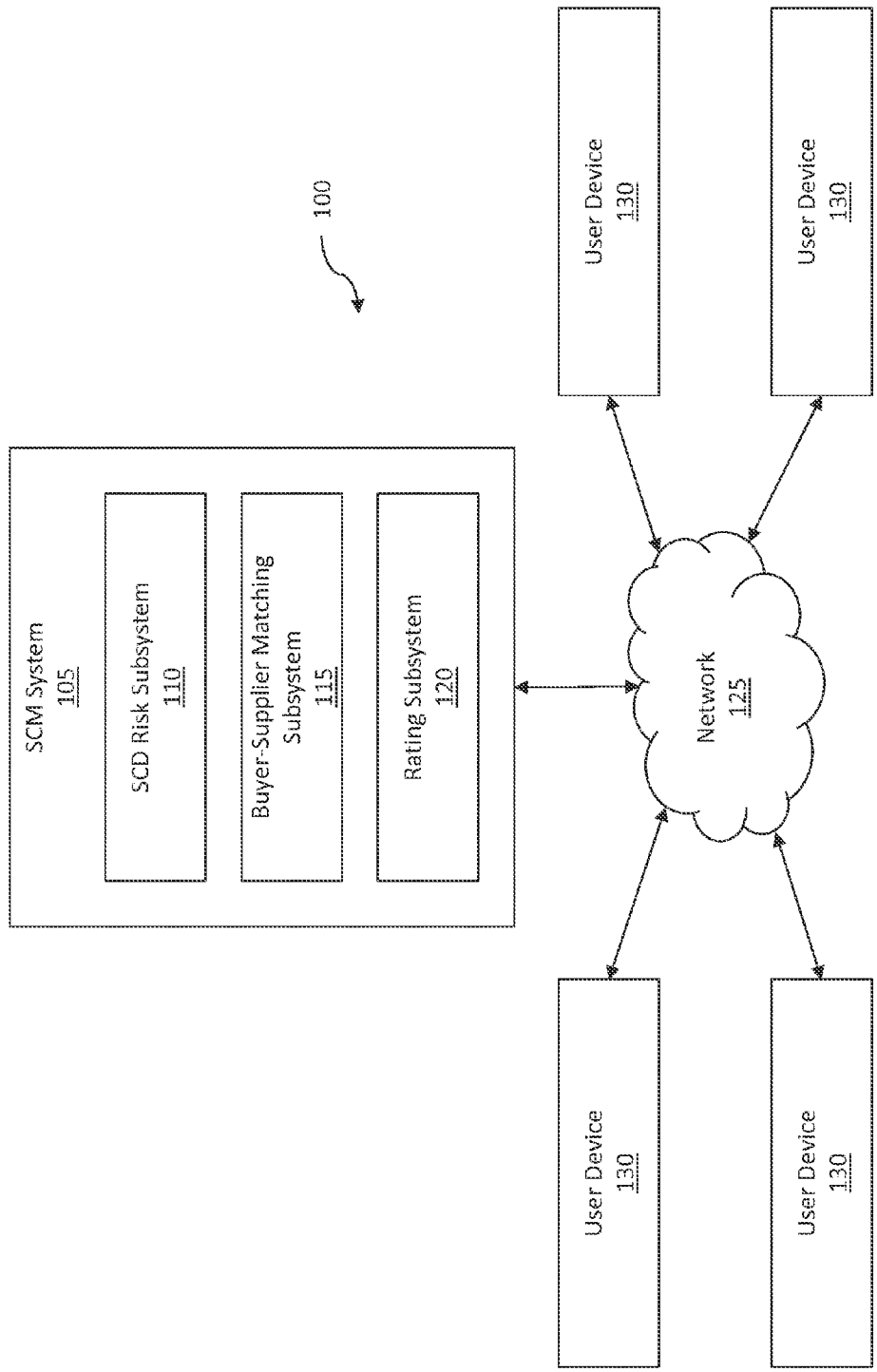
FIG. 1 is a block diagram of a supply chain management system in accordance with illustrative embodiments.

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Detailed embodiments of the invention are disclosed herein. However, the disclosed embodiments are merely exemplary and the concepts disclosed herein may be embodied in various and alternative forms. The figures are not necessarily to scale, and some features may be exaggerated or minimized to show details of particular components. Therefore, specific structural and functional details disclosed herein are not to be interpreted as limiting, but merely as representative of the disclosed particular embodiments with the understanding that these may vary according to other exemplary embodiments.

Each of the repositories and databases disclosed herein may be implemented in database software such as MySQL, Oracle DB, and Microsoft SQL Server, whether hosted locally, distributed over a network, or hosted on the cloud. The information stored in a repository or database may be obtained using one or more of the following: web crawlers; buyers and/or suppliers inputting the data into the repository or database; a system administrator of the repository, database, subsystem, or the system manually inputting the data into the repository or database; and direct communications from data sources. The repositories and databases may be updated periodically or continuously either automatically or manually. Although various databases are described herein, one or more of the various databases can be the same and/or include the same or similar information. That is, databases described herein that include the same or similar information can be the same database.

In various contexts, such as in a manufacturing context, buyers and suppliers have ongoing relationships. For instance, an automobile manufacturer in the United States can buy bushings from a supplier in India. The automobile manufacturer and the supplier in India can have an ongoing relationship in which the supplier in India sends bushings to the automobile manufacturer on a regular basis, e.g., monthly. The automobile manufacturer can rely on the supply of bushings in its manufacturing plant for consistent production of automobiles. Thus, if the stream of bushings ceased, without notice, the automobile manufacturer may have to shut down production until a new supply of bushings, with the same or substantially similar properties (e.g., size, material, tolerances, etc.), can be established. Accordingly, the automobile manufacturer in the United States can be affected by, for example, an earthquake in India that interrupts the supply of bushings by shutting down the supplier in India.

Using aspects of the present disclosure, the production of the automobile manufacturer in the United States can continue, even when the manufacturer's primary supplier of bushings from India is unexpectedly shut down. In some embodiments, a platform is provided in which the relationship between the automobile manufacturer and the supplier in India is monitored. Further, the status of the automobile manufacturer and the supplier can be monitored as well as events that may affect the manufacturer and supplier. For example, news events can be monitored, and news of an earthquake in an area in which the Indian supplier is located can be automatically detected by a system. The system can then identify one or more other suppliers of bushings used by the automobile manufacturer in the United States. The system can notify the automobile manufacturer of the disruption (or potential disruption) of its supply of bushings and provide recommended alternative suppliers. The alternative suppliers can be ranked and/or scored to assist the automobile manufacturer in choosing the most appropriate alternative supplier.

Thus, in such an example, the automobile manufacturer can quickly replace its supply of bushings such that production of automobiles can continue unhindered. In some embodiments, the system can respond to disruptions (or potential disruptions) in a supply chain and find suitable alternatives to repair any disruption in the supply chain. Further, the system creates efficiencies in the supply chain. For example, alternative suppliers can be identified that provide the same (or substantially similar) products at a lower cost than a current supplier. In another example, suppliers with a higher quality or a more suitable product for a buyer's needs can be identified. Thus, instead of the buyer (or the buyer's supply chain system) recognizing a supply chain problem when either notified by the supplier or when the buyer's shipment does not arrive on time, aspects of the present disclosure identify the supply chain problem much earlier in the process and provide recommendations for alternative suppliers, thereby minimizing the risk that a buyer will not receive an ordered product on time and/or reducing the amount of time the buyer will have to wait to receive the ordered product.

Another efficiency of some embodiments is the identification of quality suppliers and/or a ranking system for suppliers. Various aspects of a supplier can be identified and used to score and/or rank the supplier. Some example aspects include financial information, manufacturing capabilities, and customer satisfaction/experience. The scores and/or rankings can be used to determine the best candidates for the supply of a particular product for a particular buyer. In some embodiments, the scoring and/or ranking can be based on the buyer's particular needs/wants. Thus, a system of the present disclosure can identify for a buyer the best-suited suppliers for a buyer's particular situation. Instead of the buyer receiving and searching through a list of suppliers that are capable of providing the buyer's part, piece, material, etc. and the buyer sorting through and determining which suppliers are best suited for the buyer, the system can automatically and efficiently provide the best-suited suppliers.

Some embodiments of the present disclosure provide a supply chain management system that can match buyers and suppliers that should conduct business together. The matched buyers and suppliers may have similar needs and offerings. The supply chain management system performs predictive analytics, thereby promoting more efficient use of marketplace dynamics and streamlining the interaction between buyers and suppliers. For example, buyers can leverage a system that matches buyers and suppliers to receive suggestions for whom they should work with. These suggestions could be received on a one-time or on-going basis. Similarly, suppliers can leverage buyer-supplier matching subsystem 115 to more efficiently target their business development activities.

FIG. 1 is a block diagram of a supply chain management system in accordance with illustrative embodiments. According to other exemplary embodiments, additional, fewer, and/or different elements may be used. System 100 includes a supply chain management (SCM) system 105, a plurality of user devices 130, and a network 125. The supply chain management system 105 has a supply chain disruption (SCD) risk subsystem 110, a buyer-supplier matching subsystem 115, and a rating subsystem 120. According to other exemplary embodiments, SCM system 105 can include additional subsystems not represented in FIG. 1.

Supply chain management system 105 can include one or more computers, servers, logic devices, specialty computing devices, etc. Subsystems of the supply chain management system 105 can themselves be run on separate computing devices or can be run on the same computing device. The supply chain management system 105 is communicatively connected to a plurality of user devices 130 through network 125. In some embodiments, network 125 can be a local connection, such as via a cable. In some embodiments, network 125 can include a communications network such as a local area network (LAN), a wide area network (WAN), a virtual private network (VPN), a cellular network, and/or the Internet. In some embodiments, network 125 can include wired and/or wireless connections. According to other exemplary embodiments, network 125 can include any suitable communications network. Each user device 130 can be a device of a buyer of products and/or a supplier of products. In some embodiments, user devices 130 can communicate with one another directly through network 125. According to other exemplary embodiments, user devices 130 can communicate with one another via SCM system 105.

Figure 2:
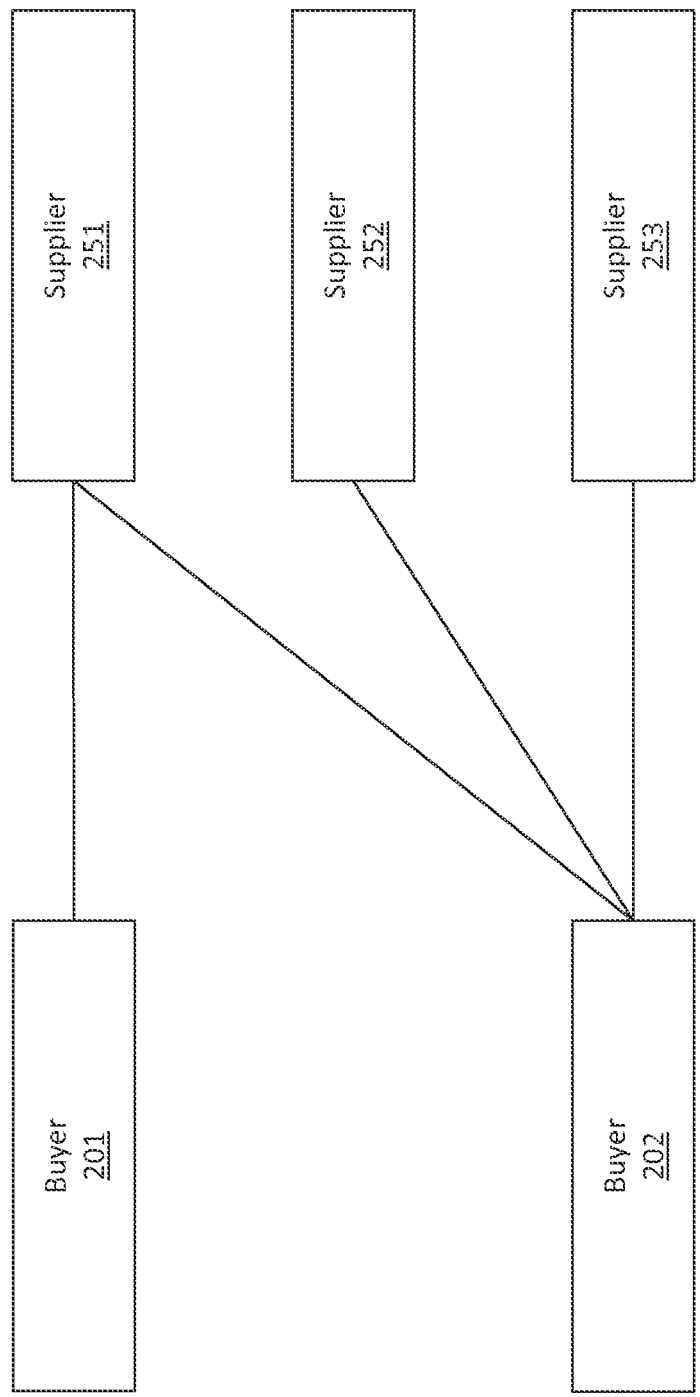
FIG. 2 is a block diagram illustrating an example of possible relationships between buyers and suppliers in accordance with an illustrative embodiment.

FIG. 2 is a block diagram illustrating an example of possible relationships between buyers and suppliers in accordance with an illustrative embodiment. According to other exemplary embodiments, additional, fewer, and/or different relationships and/or entities may exist. FIG. 2 illustrates buyer 201 and buyer 202 and supplier 251, supplier 252, and supplier 253. FIG. 2 is meant to be illustrative only, and not meant to be limiting as to the number or configuration of buyers and suppliers. For example, any suitable number of buyers or suppliers can exist. In some embodiments, one entity can be a buyer and a supplier. In some embodiments, one entity can include multiple buyers and/or suppliers. In FIG. 2, lines between the buyers and suppliers can be representative of a relationship.

As illustrated in FIG. 2, in one example, buyer 201 can have a relationship with one supplier, supplier 251. In another example, buyer 202 can have relationships with multiple suppliers, supplier 251, supplier 252, and supplier 253. Examples of relationships can be contractual relationships, prospective relationships, prior relationships, etc. Contractual relationships can include, for example, an agreement for a buyer to purchase a certain quantity of parts, a memorandum of understanding, etc.

Figure 3:
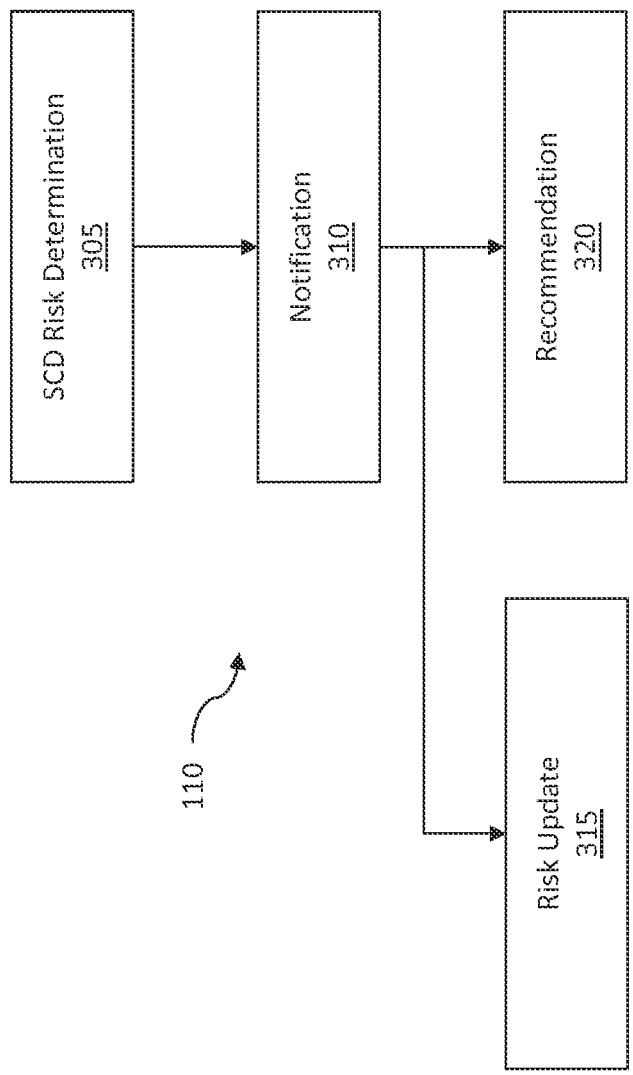
FIG. 3 is a flow chart of supply chain disruption risk subsystem in accordance with an illustrative embodiment.

FIG. 3 is a flow chart of a supply chain disruption risk subsystem in accordance with an illustrative embodiment. According to other exemplary embodiments, additional, fewer, and/or different elements may be used. Further, the use of arrows is not meant to be limiting with respect to the order or flow of operations. Supply chain disruption (SCD) risk subsystem 110 can include operations such as SCD risk determination 305, notification 310, risk update 315, and recommendation 320.

In most instances, it can be advantageous for buyers to be able to identify high-risk suppliers as soon as possible after a supply chain disruption event occurs. A supply chain management system incorporating SCD risk subsystem 110 can allow buyers to be more proactive by providing buyers with detailed supply chain disruption information in real time or shortly after an SCD event occurs. Buyers are able to leverage the identification of high-risk suppliers to create plans to mitigate costly SCD events from negatively impacting their business. In some embodiments, suppliers can be notified of an SCD event impacting another supplier, such as a competitor. In such embodiments, a supplier can take advantage of a competitor who is unable to supply its customers with a product by replacing the competitor (at least temporarily) in the supply chain.

Figure 4:
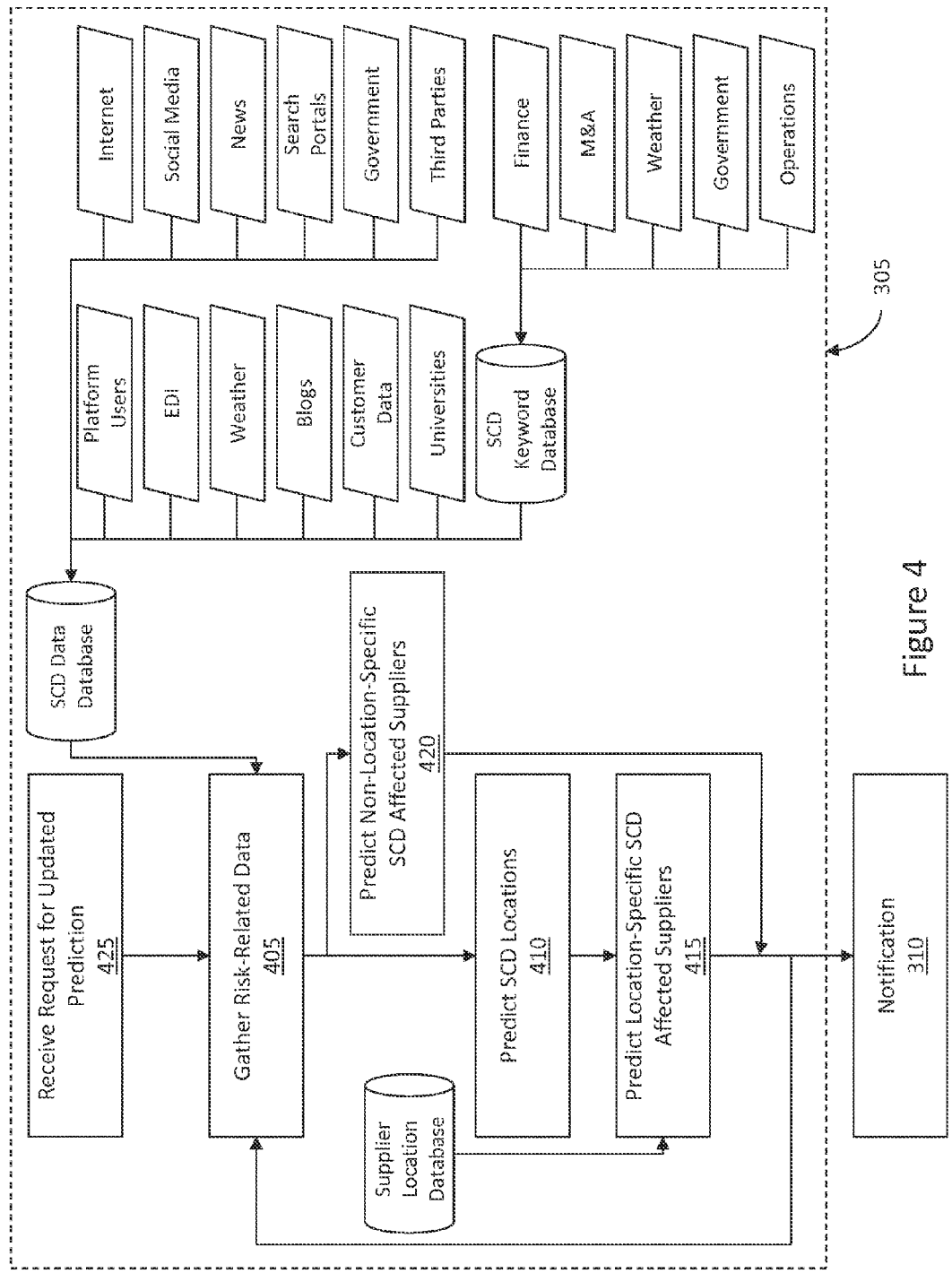
FIG. 4 is a flow chart of supply chain disruption risk determination in accordance with an illustrative embodiment.

FIG. 4 is a flow chart showing operations for supply chain disruption risk determination in accordance with an illustrative embodiment. According to other exemplary embodiments, additional, fewer, and/or different elements may be used. Further, the use of arrows is not meant to be limiting with respect to the order or flow of operations. SCD risk determination 305 includes gathering risk-related data 405, predicting supply chain disruption locations 410, predicting location-specific supply chain disruption affected suppliers 415, predicting non-location-specific supply chain disruption affected suppliers 420, and receiving a request for an updated prediction 425.

Gathering risk-related data 405 can include receiving information related to a supply chain disruption. Such information can include, for example, an indication that a tsunami impacted a region or city, an indication that there was a fire at a warehouse of a supplier, an indication that a supplier has filed for bankruptcy, etc. Such information can be gathered from one or more sources, such as users of the system (e.g., via user devices 130); the Internet; electronic data exchanges using either non-standardized formats or standardized formats (e.g., such as those provided by Electronic Data Interchange (EDI)); social media such as Twitter, Facebook, LinkedIn, etc.; weather sources such as weather.com; news sources, newspapers, and news websites such as Bloomberg, Fox News, CNN, CNBC, The Economist, Wall Street Journal, The Financial Times, NPR News, Huffington Post, BBC News, Reuters, The New York Times, The Guardian, Mail Online, USA Today, The Washington Post, ABC News, the Los Angeles Times, etc.; blogs such as blogs.com and WordPress.com; search portals such as Google, Bing, Yahoo, etc.; customer data; governments; universities; third parties; etc.

The risk-related data can be gathered and/or received using one or more methods, such as web crawlers; buyers and/or suppliers inputting data into system 100; a system administrator (or other user) inputting data manually into SCD risk subsystem 110; direct communications from data sources; etc. The risk-related data gathered can be stored in one or more memory devices, such as databases, repositories, servers, etc. FIG. 4 shows the risk-related data stored in a supply chain disruption data database. Any suitable method of storing the risk-related data can be used. For example, in some embodiments, pieces of data can be stored temporarily based on the type of information each piece of data contains. For example, a piece of data related to a snowstorm can be stored for a predetermined amount of time depending upon the severity of the snowstorm. In another example, the piece of data related to the snowstorm can be stored until an indication is received that the snowstorm is over or is resolved (e.g., roads are plowed).

Any suitable method can be used to read and/or load information into databases, repositories, etc. In some embodiments, an extraction, transformation, and load (ETL) technique is used to load data gathered for SCD event determination into a repository. Other methods now known or later developed for loading data into a repository may also be used. For example, the data in a repository may be categorized using categories such as event types, locations, time, source, etc. The above data categories are merely illustrative. Other methods of categorizing data related to SCD and now known or later developed may also be used. Data stored on a database may be used for predicting suppliers and supplier locations with high risks of SCD events.

In some embodiments, SCD risk subsystem 110 can determine the relevancy of the data gathered for SCD risk determination 110 using a repository of SCD keywords, such as the supply chain disruption keyword database shown in FIG. 4. In some embodiments, the repository of SCD keywords may contain one or more of categories of keywords such as finance; mergers and/or acquisitions (M&A); weather; government; and operations. The finance category of keywords can include keywords such as financial distress; bankruptcy; bankrupt; insolvency; closing; closing doors; dissolving; liquidity; cash flow; paying suppliers on time; credit crisis; currency volatility; FX exchange issue; financial crisis; etc. The M&A category of keywords can include keywords such as merger; acquisition; M&A; "company X buying company X" (where "company X" can be one or more names of suppliers); buyout; leveraged buyout; LBO; shareholder activist; hostile takeover; board shakeup; CEO departure; CEO firing; chairman departing; CEO appointment; etc. The weather category of keywords can include keywords such as flood; storm; tsunami; tornado; earthquake; snowstorm; avalanche; dust storm; hail storm; ice storm; road closures; fire; forest fire; volcano; adverse weather; etc. The government category of keywords can contain keywords such as tariffs; economic unrest; geological; war; invasion; political unrest; civil war; conflict; battle; etc. The operations category of keywords can include keywords such as plant strike; labor issues; labor unrest; downtime; closed; supply chain disruption; disruption; logistics issues; supply chain break; IT outage; information systems outage; power outage; quality issue; recall; quality concern; plant fire; explosion; factory collapse; poor working conditions; minimum wage increase; etc. The above-listed keywords and categories of keywords are merely illustrative. Other keywords and categories of keywords now known or later developed as being related to SCD, or the likelihood of SCD occurring, may be used in connection with SCD risk subsystem 110.

In some embodiments, categories of keywords and/or keywords can have different weights. That is, some categories of keywords and/or keywords can require greater severity and/or certainty than others to determine that an SCD event of the category of keywords and/or keywords will affect a supplier. For example, a warehouse fire can be weighted higher than geopolitical events. In such an example, fewer sources reporting a fire at a supplier's warehouse can be required to meet a risk determination threshold than sources reporting that a new political party was elected in a supplier's region. That is, it is more likely that a warehouse fire will affect a supplier's ability to satisfy orders than it is that a political regime change will affect a supplier's ability to satisfy orders. As mentioned, keywords within a particular category can have different weights. For example, a war or bombings in a region of a supplier can be weighted higher than political regime change even though war, bombings, and regime change may be under a geopolitical and/or government category.

In some embodiments, keywords can be classified into categories related to the degree or manner of impact to suppliers. For example, the keywords could be categorized into supplier-specific, supplier location-specific, and location-specific keywords. A supplier-specific category can include events that affect the supplier as a whole (e.g., all of the factories of a supplier are affected). For example, "bankruptcy" can be a keyword that affects a supplier as a whole. A supplier location-specific category can include events that affect a supplier at a particular location. For example, "fire" or "warehouse fire" can be keywords that affect a particular location of a supplier. A location-specific category can include events that affect all (or most) suppliers at a particular location. For example, "tsunami" can be a keyword that affects a particular location.

In some embodiments, risk-related data gathered in operation 405 can be received from the supplier and/or a distributor. For example, in some embodiments, data can be received related to a particular shipment. Trucks used to transport products can be equipped with a location detection device (such as a GPS sensor) and a communications transceiver (such as WiFi, cellular, etc.). The devices on the trucks can be used to communicate information to SCM system 105. Thus, trucks can transmit their location (or any other relevant information such as speed, status, malfunction, tire pressure, etc.) to SCM system 105 and the trucks' location can be received in operation 405. For example, a truck transporting products from a supplier to a buyer can be stuck in an area in which the roads were destroyed by a landslide. The devices on the truck can be used to transmit to the SCM system 105 that the truck is behind on its expected route and schedule. Such information can be used to determine that the supplier is affected by an SCD event (discussed in greater detail below). Thus, the buyer (or SCM system 105) can monitor a supply chain in real time. Such information can be used to assess potential supply chain disruption events, react quickly and efficiently to supply chain disruption events, and monitor supply chain mapping flows (e.g., allow supply chain visibility).

In some embodiments, the risk-related data gathered in operation 405 can be received by reporting systems of the supplier. Suppliers can use computer systems (including programmable logic computers (PLCs), supervisory control and data acquisition (SCADA) systems, human-machine interface (HMI) systems, etc.) to control and/or automate manufacturing processes. Such computer systems can receive information from sensors and produce information (such as which step a manufacturing batch-process plant is in) indicating the status of the supplier's manufacturing process. Such computer systems can be used to transmit status information to SCM system 105. For example, if a manufacturing plant is shut down, behind schedule, etc., an indication of such can be transmitted to SCM system 105 and can be received in operation 405. Any suitable or useful information can be received in operation 405, such as product quality, product amount, inventory amount, the number of products currently being worked on, raw materials available, etc. In some instances, the supplier can provide reports containing such information directly to the supplier's buyers. In other instances, the supplier can provide a report to SCM system 105, and the SCM system 105 can distribute the relevant information to the supplier's buyers. Further, the SCM system 105 can use the information to determine whether the supplier is affected by an SCD event. For example, if a product purity level is below a buyer's threshold purity level, the SCM system 105 can determine that the supplier will not be able to deliver the product with the proper purity to the buyer on time and, therefore, is affected by an SCD event.

As shown in FIG. 4, in some embodiments, predicting SCD locations 410, predicting location-specific SCD affected suppliers 415, and predicting non-location-specific SCD affected suppliers 420 can follow gathering risk-related data 405. Predicting SCD locations 410, predicting location-specific SCD affected suppliers 415, and predicting non-location-specific SCD affected suppliers 420 can use the risk-related data gathered in operation 405. As discussed above, predicting SCD locations 410 can determine geographic locations that are or may be affected by a supply chain disruption event. As shown in FIG. 4, predicting location-specific SCD affected suppliers 415 can use the geographic locations identified by predicting SCD locations 410.

In operation 415, SCD affected suppliers can be identified using identified SCD locations by identifying suppliers who have facilities in the identified SCD locations. The facilities of the suppliers can be stored in the supplier location database as shown in FIG. 4. For example, it may be determined that a city in South Africa is in political turmoil and operations of the city have been shut down. Such information can be identified in operation 405, and the city in South Africa may be identified in operation 410 as having a supply chain disruption event. Operation 415 can cross-reference the city in South Africa with operation locations of suppliers and identify that Supplier A has a manufacturing plant in the city of South Africa that is (or may be) affected by the political turmoil.

In operation 420, SCD affected suppliers can be identified without using the identified SCD locations. For example, Supplier B may have announced that it will discontinue production of a microprocessor. Such information can be identified in operation 405, and, based on the information, Supplier B can be identified as being a supply-chain disruption affected supplier in operation 415, at least with regard to supplying the microprocessor. Accordingly, Supplier B can be identified in operation 415 without regard to an identified SCD location that was determined in operation 410.

Any suitable method of predicting a location that has a supply chain disruption event (e.g., operation 410) or predicting supply chain disrupted suppliers (e.g., operations 415 and 420) can be used. In an illustrative embodiment, if more than a threshold number of sources are identified (e.g., in operation 405) within a certain time period that report that a location has an SCD event, then it can be predicted that the location has sufficient risk of the SCD event. In some embodiments, the certain time period can be constant for all SCD events. According to other exemplary embodiments, the certain time period can vary depending upon the SCD event. For example, an SCD event of a landslide can have a first time period (e.g., twenty-four hours) and an SCD event of political turmoil can have a second time period (e.g., one week).

In some embodiments, the threshold number of sources can be constant for all sources that are indicating the SCD event. According to other exemplary embodiments, the threshold number of sources can be dependent on the reliability of the sources. For example, the threshold can be relatively low (e.g., three sources) when the reporting sources are reliable (e.g., the Associated Press, a government agency, etc.), but the threshold can be relatively high (e.g., five hundred) when the reporting sources are unreliable (e.g., Twitter, blogs, etc.). In such an example, each source can be weighted differently depending upon reliability, and the threshold can be a threshold score. For example, the threshold score can be ten. The threshold score can be satisfied when a news source weighted with a score of four, a government source weighted with a score of five, and one hundred Twitter sources each weighed with a score of 0.02 all report an SCD event. The weighted scores can be summed, and because the weighted scores add to greater than ten (the threshold score), the SCD event can be predicted with sufficient risk tolerance.

In some embodiments, a source's weight can be time-dependent. In such embodiments, the source's weight can include a time decay element. For example, the weight given to a source's report of an SCD event can be $$S \cdot e^{t_s - t_c}$$

where S is the score given to the source for the SCD event (which can be weighted, as discussed above), $t_s$ is the time that the source reported the SCD event, and $t_c$ is the current time. The weighted scores of various sources can be summed and, if the sum of the weighted scores is above a threshold, the system can determine that the SCD event occurred. Thus, the older that a report is, the smaller the impact the report will have on determining that the SCD event occurred. Accordingly, if enough sources report the SCD event within a short enough time period, the system can determine that the SCD event occurred.

In some embodiments, SCD risk determination 305 can include monitoring detected SCD events. For example, SCD risk determination 305 can determine that a snowstorm in Detroit, Mich., may affect a supplier in Detroit. SCD risk determination 305 can use the methods described above, or any other suitable method, to monitor the status of the snowstorm to determine when the risk of the SCD event is over. For example, the snowstorm may be less severe than predicted, and SCD risk determination 305 can determine that the supplier is not at risk of being affected. In another example, the snowstorm may impact the city of Detroit, and SCD risk determination 305 can determine when the snowstorm effects no longer affect suppliers. In such an example, SCD risk determination 305 can include determining that roads in Detroit are sufficiently plowed and that power has been restored to the city.

In some embodiments, different suppliers can have differently weighted SCD events. That is, one or more of the various weights described above can be supplier-dependent. For example, a trucking company in Chicago, Ill., may have snowstorms weighted as a higher risk potential than a software company located in Chicago. The trucking company can be more susceptible to inclement weather than the software company.

In some embodiments, one or more score weights can be adjusted. In some embodiments, the score weights can be adjusted manually. The score weights can be adjusted by a system administrator and/or by the suppliers. For example, if a supplier knows that the supplier is more susceptible to cold weather than it is to a warehouse fire, the supplier can adjust the weight of a cold weather SCD event higher than a warehouse fire SCD event. In some embodiments, one or more weights can be adjusted automatically. For example, the system can monitor past predicted (or not predicted) SCD events and whether the identified supplier was actually affected by the SCD events. For example, if suppliers are flagged as at risk of a governmental coup, but the suppliers are still able to meet their orders, the weight of governmental coups can be reduced. In another example, if a supplier has one or more warehouse fires, but is still able to fulfill its orders, the weight of warehouse fires can be reduced. In such an example, the weight of warehouse fires can be reduced for that supplier. Thus, by adjusting weights, the accuracy of predicting whether a supplier is affected by an SCD event can be increased. Any suitable "learning" algorithm may be used.

In some embodiments, SCD risk determination 305 can predict an SCD event first order effect, second order effect, third order effect, etc. A first order effect can be an effect on a supplier that is caused directly by the SCD event. For example, a warehouse fire can cause a first order effect to a supplier that stores product in the warehouse. A second order effect can be an effect on a supplier that is caused by another supplier that is directly affected by the SCD event. For example, the warehouse fire can destroy plastic pellets of a first supplier that a second supplier uses in its computer monitor that it supplies to customers. Thus, although the second supplier did not experience a warehouse fire, its supply of plastic may be affected, which may affect the second supplier's ability to fulfill its customer orders. In some embodiments, the second supplier can be identified as (potentially) impacted by the warehouse fire SCD event in SCD risk determination 305.

In some embodiments, second order (or third order, etc.) effects can be determined by identifying customers of first order (or second order, etc.) affected suppliers who themselves are suppliers. In some embodiments, second order (or third order, etc.) effects can be determined by proximity to SCD events. For example, a tsunami can hit Japan, which can affect exports from Japan. A Chinese supplier can rely on imports from Japan for the product that it supplies. Thus, SCD risk determination 305 can determine that the Chinese supplier is at risk of being affected by the tsunami SCD event based on its proximity to the tsunami-affected area (e.g., Japan). For example, the weight given to predicted first order SCD locations in computing possible second order SCD events can be $$e^{-D}$$

where D is the distance between the first order SCD location and the second order SCD location. In another example, the weight given to predicted first order SCD locations in computing possible second order SCD events can be $$\frac{1}{D}$$

where D is the distance between the first order SCD location and the second order SCD location. In some embodiments, such weights can also be used to determine first order SCD event affects. For example, distance from an SCD event can be relevant to some weather SCD events, a nuclear reactor meltdown, a volcano explosion, etc.

In some embodiments, one or more negative scores can be used to determine whether an SCD event is still affecting suppliers. For example, a scoring system as described above can be used to determine that a supplier is (potentially) affected by an SCD event. Negative scores can be added to (or positive scores can be subtracted from) the score used to determine that the supplier is affected by the SCD affect. The negative scores can include sources that indicate that the SCD event has been resolved, has had less of an impact than expected, etc. For example, sources can indicate that a tsunami impacted Japan and SCD risk determination 305 can determine (as described above) that a first supplier is affected by the tsunami because the first supplier is located in Japan. After a while, sources may start to indicate that the tsunami impact on Japan is resolved (e.g., power is restored, roads are cleared, businesses are open, etc.). Such sources can be used to determine negative scores that can be added to the score that indicated that Japan is affected by an SCD event. When enough negative scores are added to the score that indicated that Japan is affected by the SCD event, the resultant score can be below the threshold for determining that Japan is affected by the SCD event, and the system can determine that Japan is no longer affected by the tsunami. The negative score sources can be any suitable source, for example, news sources, governments, etc. For example, other suppliers can indicate that they are no longer affected by the SCD event. Using the example above, when enough of the other suppliers indicate that they are no longer affected by the tsunami and are fulfilling their orders, the system can determine that Japan is no longer affected by the tsunami and, thus, that the first supplier is no longer affected by the tsunami.

As shown in FIG. 4, operations 405, 410, 415, and 420 can be run continuously. Also as shown in FIG. 4, in some embodiments, operations 405, 410, 415, and 420 can be initiated by receiving a request for an updated prediction 425. The requested for an updated prediction can be received by any suitable source such as a user or a system administrator. For example, a supplier who has been determined to be at risk of being affected by an SCD event may dispute the determination and may request that the determination is updated. For example, the supplier may have been identified as being in a town that was demolished by a tornado. However, if the supplier's warehouse was unaffected, the supplier can request an updated determination. In such an instance, the information regarding the warehouse still standing can be used when determining whether the supplier is at risk of being affected by the SCD event.

In some embodiments, SCD risk determination 305 can include a supply chain visibility function that can allow a buyer to view information related to a product throughout several tiers of production or several tiers of the supply chain. For example, many products purchased by buyers are not produced entirely by one supplier. That is, the supplier itself often is a buyer of products that the supplier uses during manufacturing. In some instances, the supplier can have other relationships that can affect a supply chain. For example, a supplier may manufacturer a product and contract a third party to store or transport the product. The supply chain visibility function can allow a buyer (or SCM system 105) to evaluate a supplier, the supplier's supplier, etc. Any suitable number of tiers can be monitored. For example, one, two, three, five, ten, etc. tiers can be monitored.

In an example, an automotive manufacturer can purchase half shafts from Supplier A. Supplier A can purchase rubber boots for the half shafts from Supplier B. Supplier B can purchase rubber for its rubber boots from Supplier C. In some embodiments, gather risk-related data 405 can be performed for each of Supplier A, Supplier B, and Supplier C. Relevant information can be provided to the automotive manufacturer to allow the automotive manufacturer to evaluate the half shafts purchased from Supplier A. For example, SCM system 105 can determine that Supplier C often produces rubber that is lower quality than required for Supplier B. Thus, the automotive manufacturer or SCD risk subsystem 110 can use such information to determine a risk value that the half shafts ordered from Supplier A will be delivered on time. For example, the risk value may increase because the rubber boots received by Supplier A from Supplier B have a greater risk of being defective, thereby delaying the delivery of the half shafts to the automotive manufacturer from Supplier A.

Using the example above, SCD risk subsystem 110 can be used to determine that the manufacturing plant of Supplier B was engulfed in a wildfire and, therefore, is at risk of being affected by an SCD event. The manufacturing plant of Supplier B can be the manufacturing plant in which Supplier B manufactures the rubber boots that Supplier A uses in its half shafts provided to the automotive manufacturer. In some embodiments, such information can be presented to the automotive manufacturer to alert them of the risk posed to the supply of half shafts. In some embodiments, such information can be used to determine a risk that the Supplier A will be affected by the SCD event (e.g., the wildfire).

Thus, the supply chain visibility function can provide buyers (and suppliers) with information that has traditionally been too cumbersome, difficult, and cost prohibitive to obtain. By using system 100, supply chain related information is gathered and analyzed efficiently by a single system, such as SCM system 105. That is, by using a system such as SCM system 105 that gathers information about various buyers and suppliers, the information can be provided to users (e.g., buyers or suppliers) without the users tracking down the information themselves. In some instances, the information can be routinely or automatically updated. In some instances, the information can be information that is already gathered by the SCM system 105 and special efforts may not need to be made by suppliers to provide the relevant information to SCM system 105.

In some instances, efficiencies can be created by crowd-sourcing information. Obtaining information into a system such as SCM system 105 that can be quickly updated and maintained and distributing the information to multiple users of the system is more efficient and cheaper than users gathering and analyzing their own data. In some instances, such a system can gather information that is not available to individual users (buyers or suppliers). For example, if the automotive manufacturer in the example above was interested in financial information of the rubber supplier Supplier C, the automotive manufacturer may have a difficult time obtaining Supplier C's financial information. Supplier C may not be comfortable sharing such information with a company with which it has no direct relationship. However, Supplier C may feel comfortable sharing such information with a trusted system, such as SCM system 105.

In some embodiments, a buyer can request to view a supply chain. For example, a buyer can request to view three tiers of a particular product's supply chain. In such an example, the buyer can input into SCM system 105 identification information for the product (such as a serial number, part number, etc.). The first tier supplier (e.g., the supplier that received the buyer's order) can input into SCM system 105 all second tier suppliers to the first tier supplier for the product. The second tier supplier can include suppliers for parts that the first tier supplier uses to manufacture the product, a supplier that the first tier supplier gets the product from, a storage facility the product is stored, transportation processing locations such as docks, ports, and warehouses, for the product, etc. The same or similar information can then be gathered of the third tier suppliers from the second tier suppliers. Thus, the buyer of the product (or SCM system 105) can view the locations of first, second, third, etc. tier suppliers to evaluate a risk that the product will not arrive to the buyer on time. For example, if a large portion of the first, second, and/or third tier suppliers are within a small area, the buyer may wish to find an alternative or backup source for the part in the event a localized SCD event occurs, such as a tsunami.

The supply chain visibility function can allow a buyer, supplier, or SCM system 105 to monitor a supply chain in real time. Thus, if, for example, a typhoon hits Taiwan, the suppliers in a supply chain (e.g., not just the suppliers to the buyer, but the suppliers' suppliers, etc.) affected by the typhoon (or potentially affected) can be quickly identified and the appropriate notifications can be sent to those who may be affected. By quickly identifying risks such as a failure in the supply chain, appropriate actions can be taken to minimize or eliminate any impact on a buyer (or supplier). For example, recommended replacements for affected suppliers can be identified. The recommended replacements can be contacted and arrangements can be made such that a buyer can still receive an order on time, or the time the buyer must wait until the products are received can be minimized.

Figure 5A:
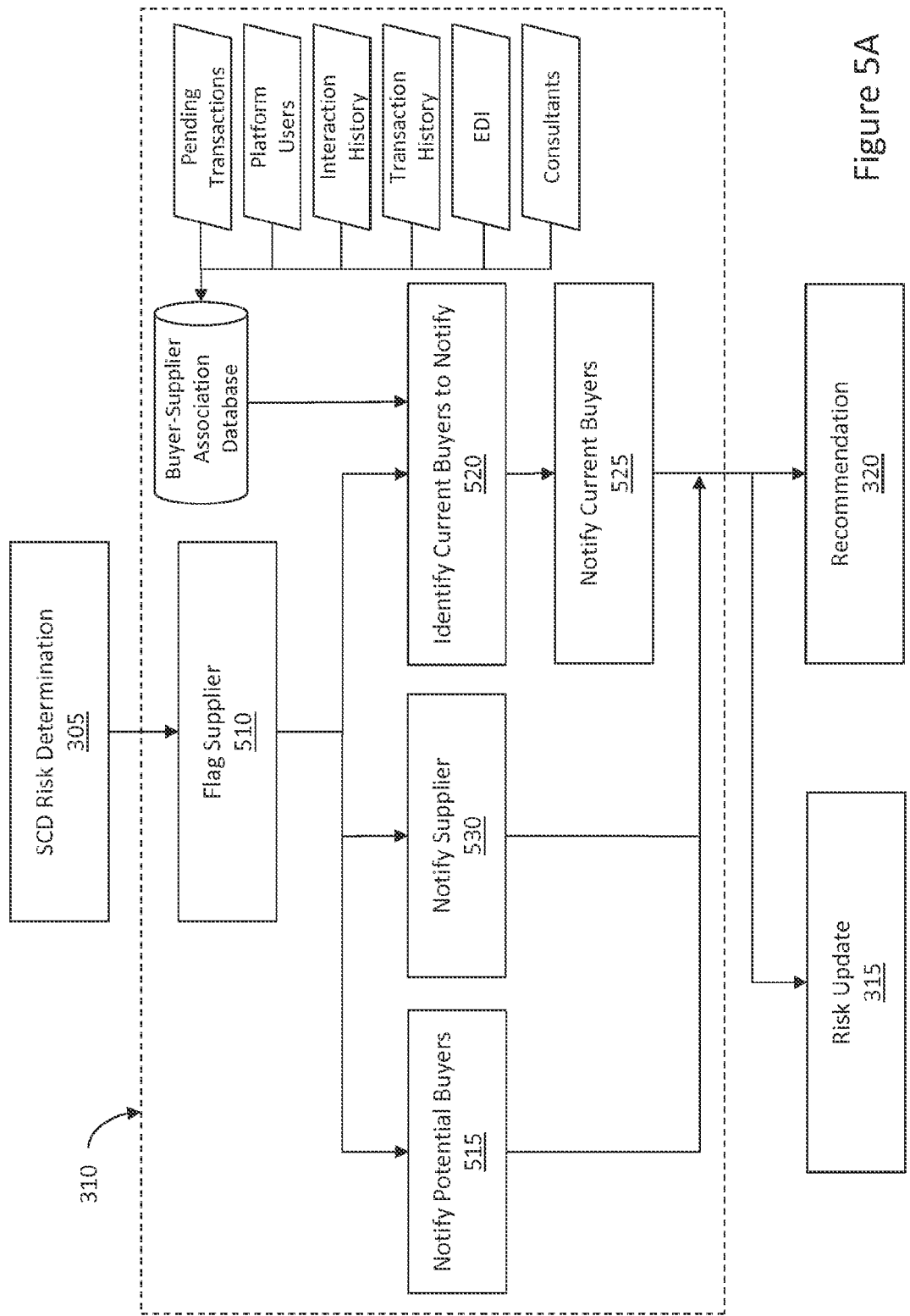
FIG. 5A is a flow diagram of a method of notification for identified SCD event affected suppliers in accordance with an illustrative embodiment.

In some embodiments, SCD risk subsystem 110 can include notification of suppliers identified in SCD risk determination 305. FIG. 5A is a flow diagram of a method of notification for identified SCD event affected suppliers in accordance with an illustrative embodiment. According to other exemplary embodiments, additional, fewer, and/or different elements may be used. Also, the use of arrows in the flow diagram is not meant to be limiting with respect to the order of operations. Notification 310 includes flagging a supplier 510, notifying potential buyers 515, identifying current buyers to notify 520, notifying current buyers 525, and notifying the supplier 530.

In some embodiments, a database or list can be maintained of suppliers. The database can include information such as the supplier's name, location(s), product(s), etc. The database can further include whether the suppliers are affected by an SCD event. In some embodiments, if it is determined in SCD risk determination 305 that a supplier is (potentially) affected by an SCD event, the database of suppliers is updated to indicate that the supplier is (potentially) affected by the SCD event. In such embodiments, flagging suppliers 510 can include updating the database. In other embodiments, any suitable method can be used to flag suppliers to indicate that the suppliers are (potentially) affected by an SCD event.

In some embodiments, notification 310 can include notifying potential buyers 515. Notify potential buyers 515 can include, for example, displaying an icon on a screen indicating that a supplier is at risk of being affected by an SCD event. For example, if a potential buyer searches a database for suppliers of bottled water, a list can be displayed indicating suppliers satisfying the potential buyer's search criteria. In the list, if a supplier is at risk of being affected by an SCD event, an icon can be displayed next to the name (or in the same row or column) of the supplier. In other embodiments, the color of the text of the supplier's name can be indicative of the risk that the supplier is affected by the SCD event. Any suitable method of indicating that a supplier is at risk of being affected by an SCD event can be used. In some embodiments, a supplier's profile page can indicate whether the supplier is at risk of being affected by an SCD event.

In some embodiments, notification 310 can include identifying current buyers to notify 520. In some embodiments, "current buyers" can include any entity that has a relationship with a supplier that has been identified as being at risk of being affected by an SCD event, or any subset thereof. For example, "current buyers" can include buyers that have open orders with the supplier, buyers who previously purchased from the supplier, buyers that have initiated a relationship with the supplier but have not yet purchased from the supplier (e.g., a memorandum of understanding has been agreed to), buyers that have recently visited the supplier's profile page, etc.

Identifying current buyers to notify of a supplier's risk of being affected by an SCD event can be performed using any suitable method. For example, a list of previous purchasers can be maintained for each supplier. In another example, a database, list, repository, etc. can be maintained that keeps track of buyer-supplier associations, such as the buyer-supplier association database shown in FIG. 5A. Such a database can include information gathered from platform users (e.g., buyers who supply a list of current suppliers or suppliers who provide a list of current buyers); pending buyer-supplier transactions; a history of a buyer who rated a supplier; a history of a supplier who rated a buyer; a buyer-supplier interaction history (e.g., via messages, emails, complaints); a buyer-supplier transaction history; EDI; consultants; etc. Such a database can include information gathered from buyers; suppliers; buyers' websites; suppliers' websites; electronic data exchanges using either non-standardized formats or standardized formats (e.g., electronic data interchange (EDI)); business intelligence providers (e.g., Covisint Corp.); industry associations; consultants; news organizations; governments; etc.

In some embodiments, all identified current buyers are notified of a supplier being at risk of being affected by an SCD event. According to other exemplary embodiments, only some of the current buyers are so notified. For example, identified current buyers can have a weighted score of their relationship to the supplier that is at risk of being affected by the SCD event. The weighted score can be based on the potential of the buyer to be affected if the supplier fails to fulfill orders. In some embodiments, a buyer is notified if the buyer's score is above a threshold. According to other exemplary embodiments, the type of notification can be dependent on the buyer's score. For example, a buyer with a score of between zero and ten may not be notified; a buyer with a score of between ten and twenty may be notified via email of a risk that the supplier may not fulfill orders; a buyer with a score of between twenty and thirty may be notified via email and short message service (SMS) text message; a buyer with a score of between thirty and forty may be notified via email, SMS text message, and a phone call; etc. In some embodiments, the content of the notification can be modified based on the buyer's score. The modified content can include the type of language used (e.g., urgency), the amount of information included, options for following up on the notification, etc.

A buyer's score can be determined based on the relationship that the buyer has with the supplier. Various data points may have differing weights. For example, a confirmed outstanding purchase order can be weighted higher than a confirmed past purchase order. Additionally, the differing weights can be time dependent, as described above, such that more recent data points are weighted heavier. In some embodiments, as described above, the weights given to various data points can be altered to provide a more accurate identification of buyers who are to be notified. In some embodiments, the buyer's score can be based on the importance of the supplier's product to the buyer. For example, a buyer who receives bottled drinking water from a supplier (where the bottled drinking water can be easily obtained from another source) can have a lower score than a buyer who receives a customized, critical component of the buyer's product (e.g., an engine, a microprocessor, a display, etc.) from the supplier.

In some embodiments, notification 310 can include notifying current buyers 525. The buyers identified in operation 520 can be notified of the supplier's risk of being affected by an SCD event. Any suitable method of notifying buyers can be used. For example, buyers can be notified by displaying an alert on the buyer's dashboard, home page, etc.; displaying an alert on the supplier's information page, profile page, etc.; emailing the buyer; calling the buyer; sending the buyer a fax; sending the buyer an SMS text message; displaying an indication on a geographical information system (GIS) display; sending the buyer an in-platform message; sending the buyer a message via social media; etc.

In some embodiments, notification 310 can include notifying the supplier 530. Notifying the supplier can include indicating to the supplier that the supplier has been flagged as being at risk of being affected by an SCD event. Any suitable method of notifying the supplier can be used. For example, the supplier can be notified by displaying an alert on the supplier's dashboard, home page, etc.; displaying an alert on the supplier's information page, profile page, etc.; emailing the supplier; calling the supplier; sending the supplier a fax; sending the supplier an SMS text message; displaying an indication on a geographical information system (GIS) display; sending the supplier an in-platform message; sending the supplier a message via social media; etc.

Figure 5B:
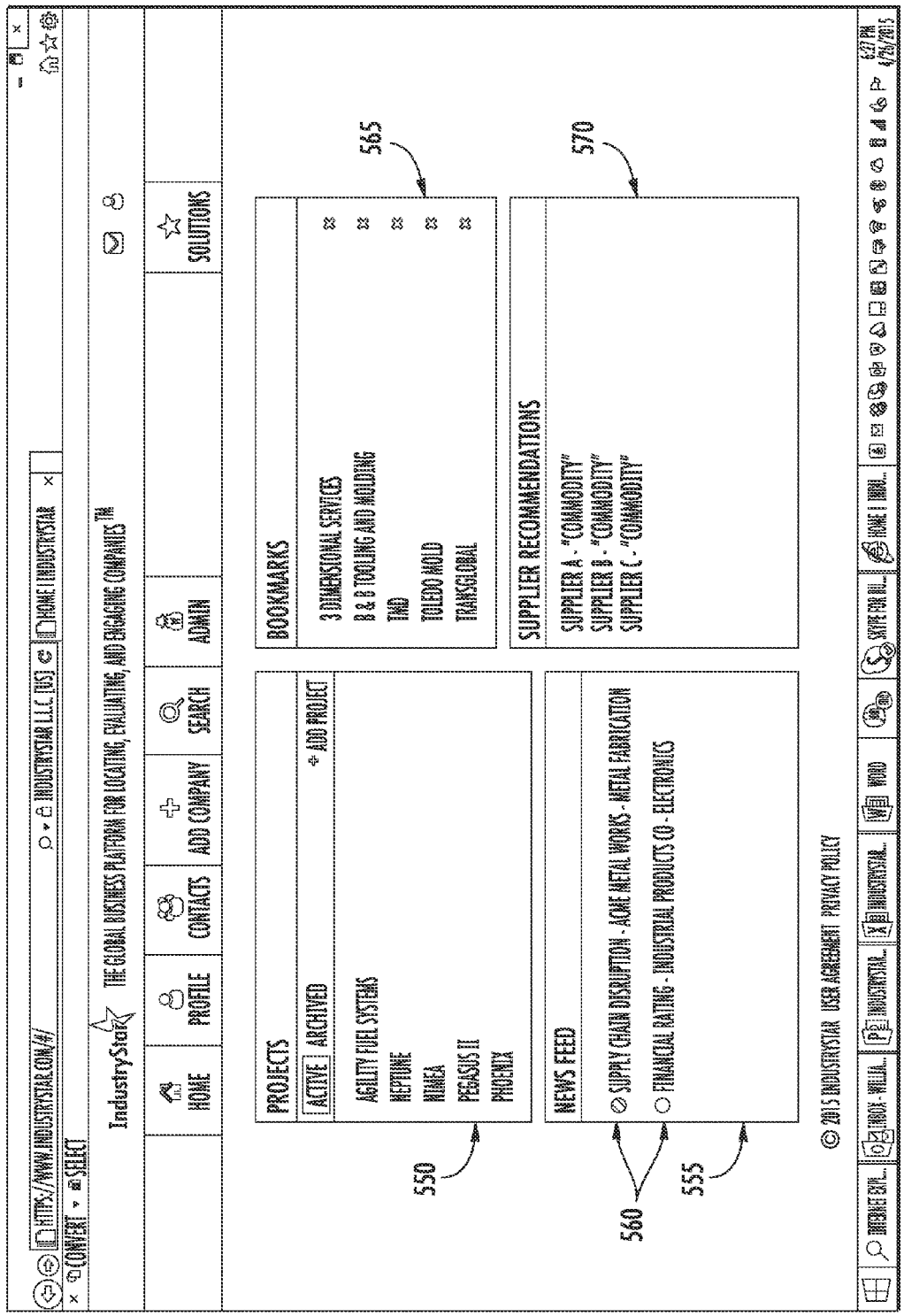
FIG. 5B is an illustration of a dashboard display in accordance with an illustrative embodiment.

FIG. 5B is an illustration of a dashboard display in accordance with an illustrative embodiment. According to other exemplary embodiments, additional, fewer, and/or different elements may be used. Also, FIG. 5B is meant to be illustrative only and is not meant to be limiting as to the layout or particular configuration of elements. The dashboard display shown in FIG. 5B is one way in which a user can be notified. Although FIG. 5B illustrates an example of a buyer's dashboard screen, the features, layout, etc. can also be used to display a supplier's dashboard screen. As shown in FIG. 5B, a dashboard display has a plurality of sections including a projects section 550, a news feed section 555, a bookmarks section 565, and a supplier recommendations section 570.

The projects section 550 can display active and/or archived projects of the buyer. The bookmarks section 565 can include bookmarked webpages, user profiles, searches, products, etc. that were bookmarked by the buyer. The news feed section 555 can include notifications, descriptions, etc. of events relevant to or interesting to the buyer. For example, the news feed section 555 can include indications that one or more suppliers have been identified to be at risk of being affected by a supply chain disruption event. In some embodiments, indicators 560 can be used to indicate a severity, a confidence level, a score, an urgency level, etc. of the news feed item. The supplier recommendations section 570 indicates one or more recommended suppliers to the buyer. Each indication of the recommended supplier can include the supplier name and which need the supplier can fill (e.g., which commodity, part number, etc.).

As shown in FIG. 3, SCD risk subsystem 110 can include recommendation 320. Recommendation 320 can provide to buyers a recommended alternative to the supplier that is at risk of being affected by an SCD event. For example, a buyer can have an outstanding purchase order for o-rings from a first supplier when the first supplier is determined to be (potentially) affected by an SCD event. Recommendation 320 can recommend to the buyer an alternative supplier from whom the buyer can receive o-rings. The recommended alternative suppliers can be identified using the buyer-supplier matching subsystem 115, which is described in greater detail below. In an alternative embodiment, the recommended alternative suppliers can be identified using a business intelligence provider, such as Covisint Corp.

Figure 6:
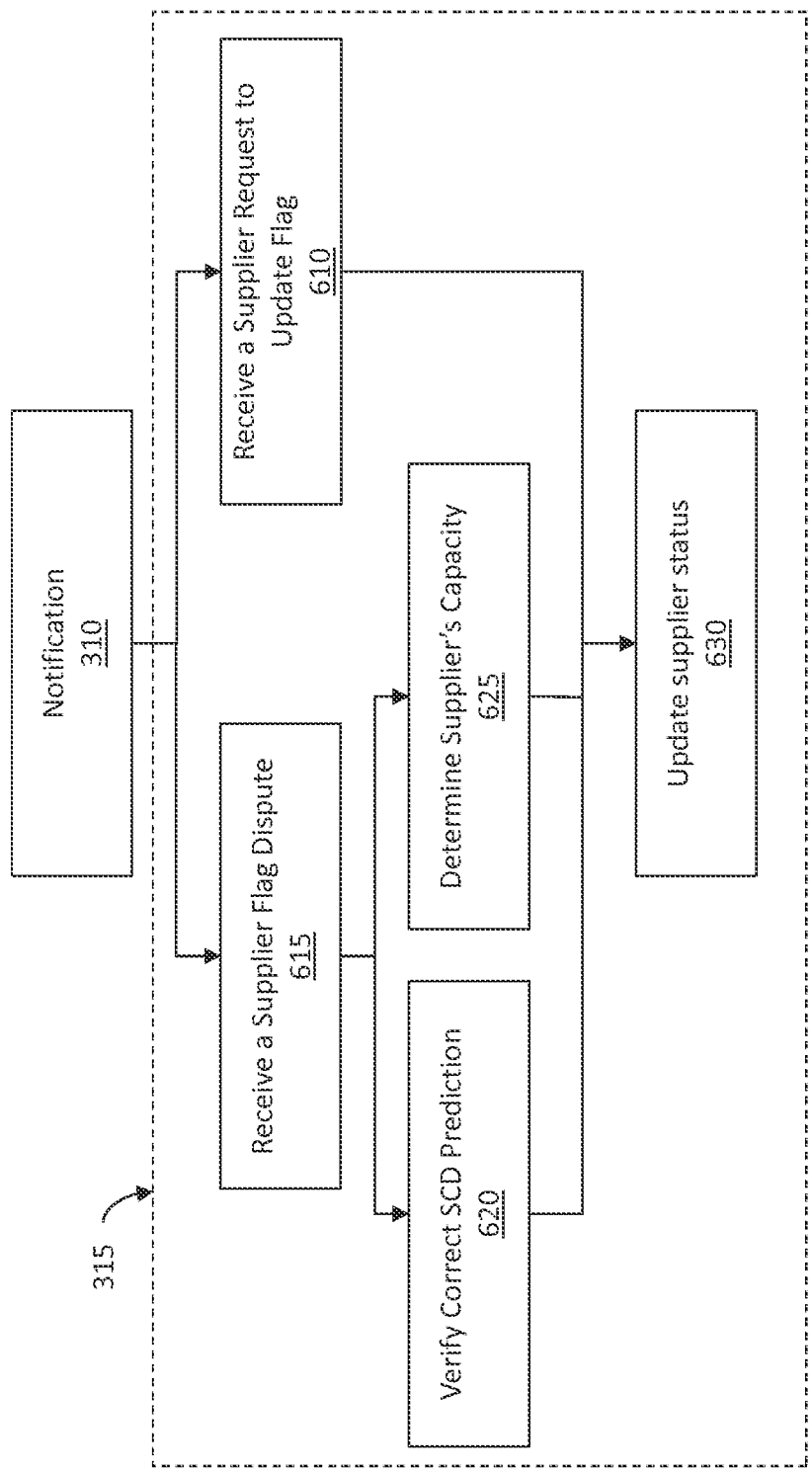
FIG. 6 is a flow diagram of a method for updating the determination that a supplier is at risk of being affected by an SCD event in accordance with an illustrative embodiment.

In some embodiments, SCD risk subsystem 110 can include risk update 315. Although illustrated in the figures as being after notification 310, risk update 315 can be performed at any suitable time, for example after risk determination 305. FIG. 6 is a flow diagram of a method for updating the determination that a supplier is at risk of being affected by an SCD event in accordance with an illustrative embodiment. According to other exemplary embodiments, additional, fewer, and/or different elements may be used. Also, the use of arrows in the flow diagram is not meant to be limiting with respect to the order or flow of operations. Risk update 315 includes receiving a supplier request to update the flag 610, receiving a supplier flag dispute 615, verifying that the correct SCD prediction was made 620, determining the supplier's capacity 625, and updating the supplier status 630.

After a supplier is identified as being potentially at risk of being affected by an SCD event in operation 305, the supplier can be notified of such. That is, the supplier can be notified that it has been flagged within the system as being at risk of being affected by an SCD event. Any suitable method can be used to notify the supplier, such as operation 530.

In some embodiments, receive a supplier request to update the flag 610 can include receiving an indication from a supplier that the supplier's status should be updated. As discussed above with respect to receive request for updated prediction 425 (shown in FIG. 4), a supplier can request re-evaluation of its status of, for example, being at risk of being affected by an SCD event. Receiving a supplier request to update the determination that the supplier is at risk of being affected by an SCD event can be performed using any suitable method. For example, the supplier can make the request via phone call, SMS text message, email, in-platform-messaging, etc. In some embodiments, receive a supplier request to update the flag 610 is not performed. In such embodiments, the system can automatically and/or constantly update the supplier's status based on available information, including information provided by the supplier.

In some embodiments, the supplier can request an update of the determination that the supplier is at risk of being affected by an SCD event. For example, a supplier can be robbed and its supply of product can be stolen. Consequently, the system can determine that the supplier is at risk of being affected by the SCD event. After the supplier replenishes its stock, the supplier can request that the risk determination be re-evaluated based on the supplier no longer being affected by the SCD event.

In some embodiments, risk update 315 can include receiving a supplier flag dispute 615. As discussed above, a supplier who has been flagged as being at risk of being affected by an SCD event may not actually be affected by the SCD event. That is, in some instances, the wrong prediction can be made. The supplier can notify the system that the supplier believes that the prediction was incorrect or no longer applies. The supplier can use any suitable method.

Verifying the correct SCD prediction 620 can re-evaluate the determination that the supplier is at risk of being affected by an SCD event. In some embodiments, verifying the correct SCD prediction 620 can be automated and/or include algorithms for verifying the risk determination. In some embodiments, verifying the correct SCD prediction 620 can include a human input and/or evaluation of the risk determination. For example, if a supplier disputes a determination that it is at risk of being affected by an SCD event, verifying the correct SCD prediction 620 can include determining whether a mistake was made during the previous determination. Information such as whether the sources that purportedly reported the SCD event actually reported the SCD event (e.g., whether a mistake was made in translating and/or interpreting a source), how much weight is given to the sources, whether the supplier's location is the same location as the SCD event (e.g., Paris, France, vs. Paris, Tex., U.S.A.), etc. can be used to verify the validity of the risk determination.

In some embodiments, if the supplier disputes the risk determination, the supplier can identify information that negates the purported effect of the SCD event. In some embodiments, the system can identify such information. As shown in FIG. 6, risk update 315 can include determining a supplier's capacity 625. For example, a supplier can have a warehouse in Omaha, Nebr., explode and the supplier can be determined to be at risk of being affected by an SCD event (e.g., the explosion). The supplier can dispute the determination and supply (or point to) information indicating that the supplier has another warehouse in Fargo, N. Dak., that stores the same product and that the supplier's ability to fulfill orders is unaffected by the explosion in Omaha. Thus, determining a supplier's capacity 630 can include determining that the supplier has the capability to continue to fulfill orders for its product.

Although not shown in FIG. 6, any suitable reason can be used for reversing the determination that a supplier is at risk of being affected by an SCD event. Some examples include determining that the supplier has sufficient capacity to fulfill orders; confirming that there is no SCD event at the supplier's location; determining that a threshold percentage of suppliers within a region dispute their status; determining that the supplier's status was disputed from a trustworthy source (e.g., an authenticated email address); confirming with local authorities that an SCD event has been resolved (e.g., power restored, streets plowed); etc.

In some embodiments, update supplier status 630 can include indicating that the supplier is not at risk of being affected by an SCD event. For example, a supplier's status can be updated in a database. In some embodiments, based on update supplier status 630, buyers and/or suppliers can be notified of the change in status using any suitable notification method, including notification 310. Updating supplier status 630 can include un-flagging the supplier within a database.

Figure 7:
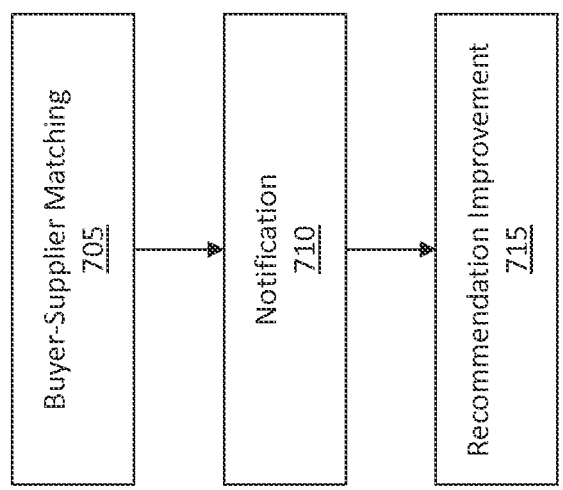
FIG. 7 is a flow diagram of a buyer-supplier matching subsystem in accordance with an illustrative embodiment.

FIG. 7 is a flow diagram of a buyer-supplier matching subsystem in accordance with an illustrative embodiment. According to other exemplary embodiments, additional, fewer, and/or different elements may be used. Also, the use of arrows in the flow diagram is not meant to be limiting with respect to the order of operations. Buyer-supplier matching subsystem 115 includes buyer-supplier matching 705, notification 710, and recommendation improvement 715.

Figure 8A:
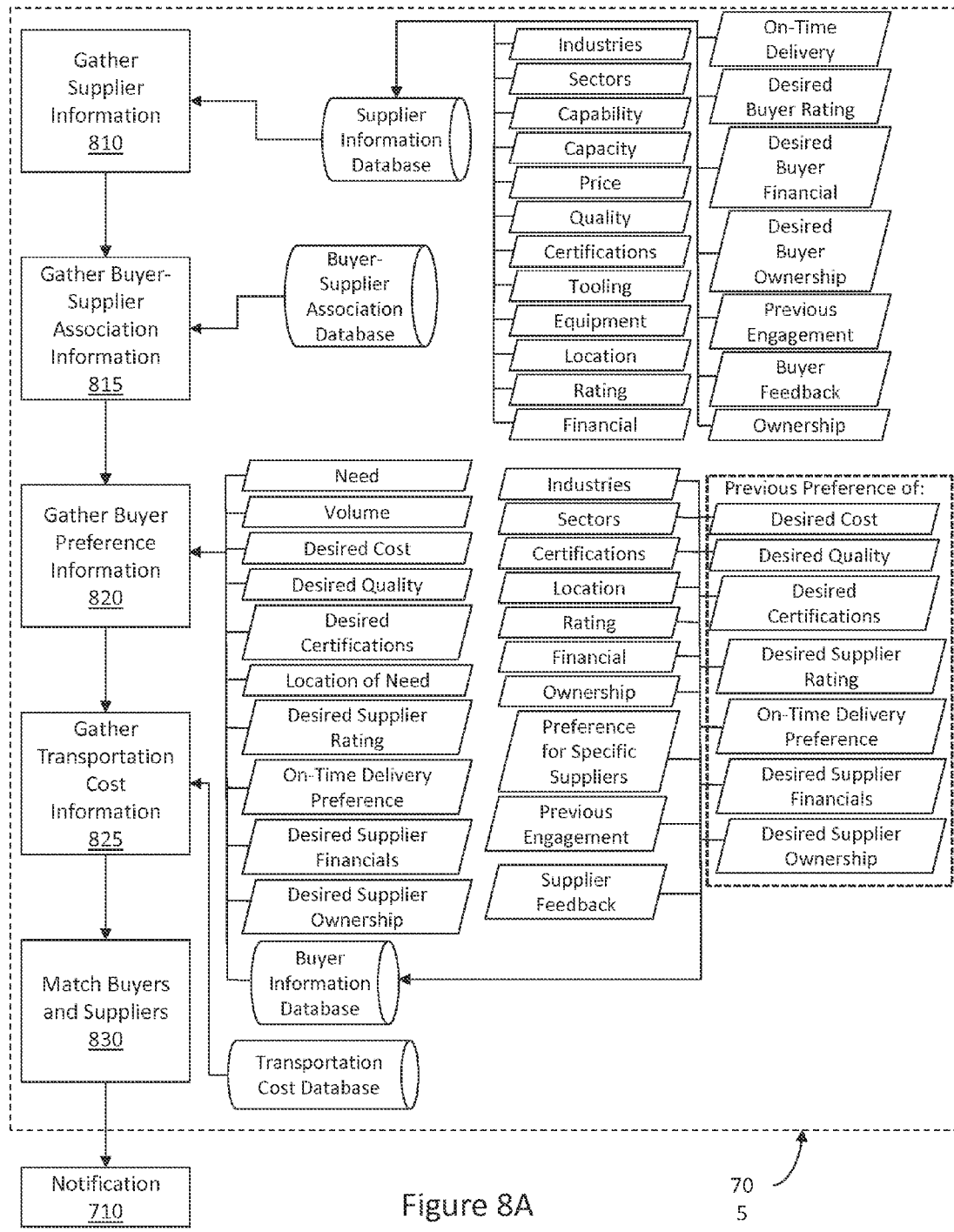
FIG. 8A is a flow diagram of buyer-supplier matching in accordance with an illustrative embodiment.

FIG. 8A is a flow diagram of buyer-supplier matching 705 in accordance with an illustrative embodiment. According to other exemplary embodiments, additional, fewer, and/or different elements may be used. Also, the use of arrows in the flow diagram is not meant to be limiting with respect to the order of operations. For example, one or more of the operations can be performed simultaneously. Buyer-supplier matching 705 includes gathering supplier information 810, gathering buyer-supplier association information 815, gathering buyer preference information 820, gathering transportation cost information 825, and matching buyers and suppliers 830.

In some embodiments, buyer-supplier matching 705 can include gathering supplier information 810. Information regarding a supplier can be gathered and/or received using any suitable method. For example, a supplier information database and/or repository can be used to store supplier information, such as the supply chain disruption data database shown in FIG. 8A. Such a database can include information about one or more suppliers including suppliers' industries; sectors; capability; capacity; product price; quality; certifications; tooling; equipment; location; rating; on-time delivery record; financial information; ownership information; desired buyer rating; desired buyer financial information; desired buyer ownership; previous engagements; feedback from buyers (e.g., numerical rating and/or written); etc. Such a database can include information gathered from buyers; suppliers; buyers' websites; suppliers' websites; electronic data exchanges using either non-standardized formats or standardized formats (e.g., electronic data interchange (EDI)); business intelligence providers (e.g., Covisint Corp.); industry associations; consultants; news organizations; governments; etc.

In some embodiments, buyer feedback can include whether a supplier has been endorsed, qualified, and/or approved by one or more buyers. A buyer's endorsement can be an indication that the buyer has been satisfied with the supplier's product and/or service or otherwise commend the supplier or recommend the use of the supplier. For example, a buyer's endorsement can include a discrete endorsement (e.g., "thumbs up," "thumbs down," or neutral; a numerical rating or score; a binary indication such as recommended or neutral; etc.). According to other exemplary embodiments, a buyer's endorsement can include a testimonial, a description, a written review, etc. A buyer can qualify the use of a supplier. The buyer's qualification of a supplier can be an indication by the buyer that the supplier is qualified to provide the product or service of the supplier. For example, a buyer can qualify a supplier, thereby advancing the relationship between the buyer and the supplier. The qualification of the supplier can allow the supplier to provide quotes to the buyer. The buyer can also approve a supplier. Approval of a supplier can be an indication by the buyer that the supplier is approved to do business with the buyer. A buyer can review various aspects of a supplier before approving a supplier. For example, a buyer can review agreements with other suppliers such as exclusive purchase agreements, manufacturing capabilities of the supplier, government or industry certifications of the supplier, product quality of the supplier, etc.

Some examples of industries include automotive; medical device; consumer products; infrastructure; energy; mining; chemical; pharmaceutical; raw materials; aerospace; food and/or beverages; heavy-duty truck manufacturing; etc. Some examples of sectors include manufacturer; distributor; wholesaler; retailer; etc. Some examples of certifications can include TS 16949; ISO 9001; ISO 14001; ISO 13485; governmental certifications; ability to import/export with certain countries; industry certifications; etc. Some examples of a supplier's capability include machining; machining carbon fiber (e.g., prototypes); prototyping; casting; casting carbon fiber; plastic manufacturing; plastic thermoforming; plastic injection molding; molding; stamping; welding; painting; powder coating; ability to work with materials such as polyurethane, urethane, adhesives, etc.; ablation casting; bending; air freight; etc.

In some embodiments, the supplier information database can include contact information. The contact information can include contact information for sales representatives, managers, company presidents or leaders (e.g., C-level executives), etc. The contact information can be updated by the supplier as the contact information changes. For example, a sales representative may leave employment by a supplier and the sales representative may not provide his or her customers with a method of contacting the supplier once the sales representative leaves. Thus, in some embodiments, system 100 can allow users to find up-to-date contact information for suppliers or notify users when contact information changes.

In some embodiments, the supplier information database can include capability terms and/or capability term chains. Each capability term can describe an aspect of the supplier. Capability term chains can contain multiple capability terms. The capability term chains can be used to provide a brief description that is more specific than the capability terms themselves. For example, a supplier of wiring harnesses for motorcycles can be associated with capability terms including "automotive," "motorcycle," "manufacturer," and "wire harness." The same supplier can be associated with capability term chains such as "motorcycle; wire harness," "automotive; wire harness," "manufacturer; wire harness," etc. In some embodiments, the order of the capability terms in capability term chains can be ignored. Thus, "motorcycle; wire harness" can be equivalent to "wire harness; motorcycle." In some embodiments, the capability terms can be chosen amongst a predetermined list. According to other exemplary embodiments, the capability terms can be any suitable term. In some embodiments, the supplier can choose the capability terms and/or term chains associated with the supplier. According to other exemplary embodiments, a system administrator, buyers, etc. can choose the capability terms and/or term chains associated with the supplier. Thus, in some embodiments, a buyer searching for a supplier of motorcycle wiring harnesses can search for suppliers associated with the term chain "motorcycle; wire harness."

In some embodiments, the capability terms and/or capability term chains can be used to search for buyers and/or suppliers. In some embodiments, the capability terms and/or capability term chains can be displayed on a profile page of the buyer/supplier, next to the name of the buyer/supplier when displayed (e.g., in news feed section 555 and/or supplier recommendations section 570 of FIG. 5B), etc.

Figure 5C:
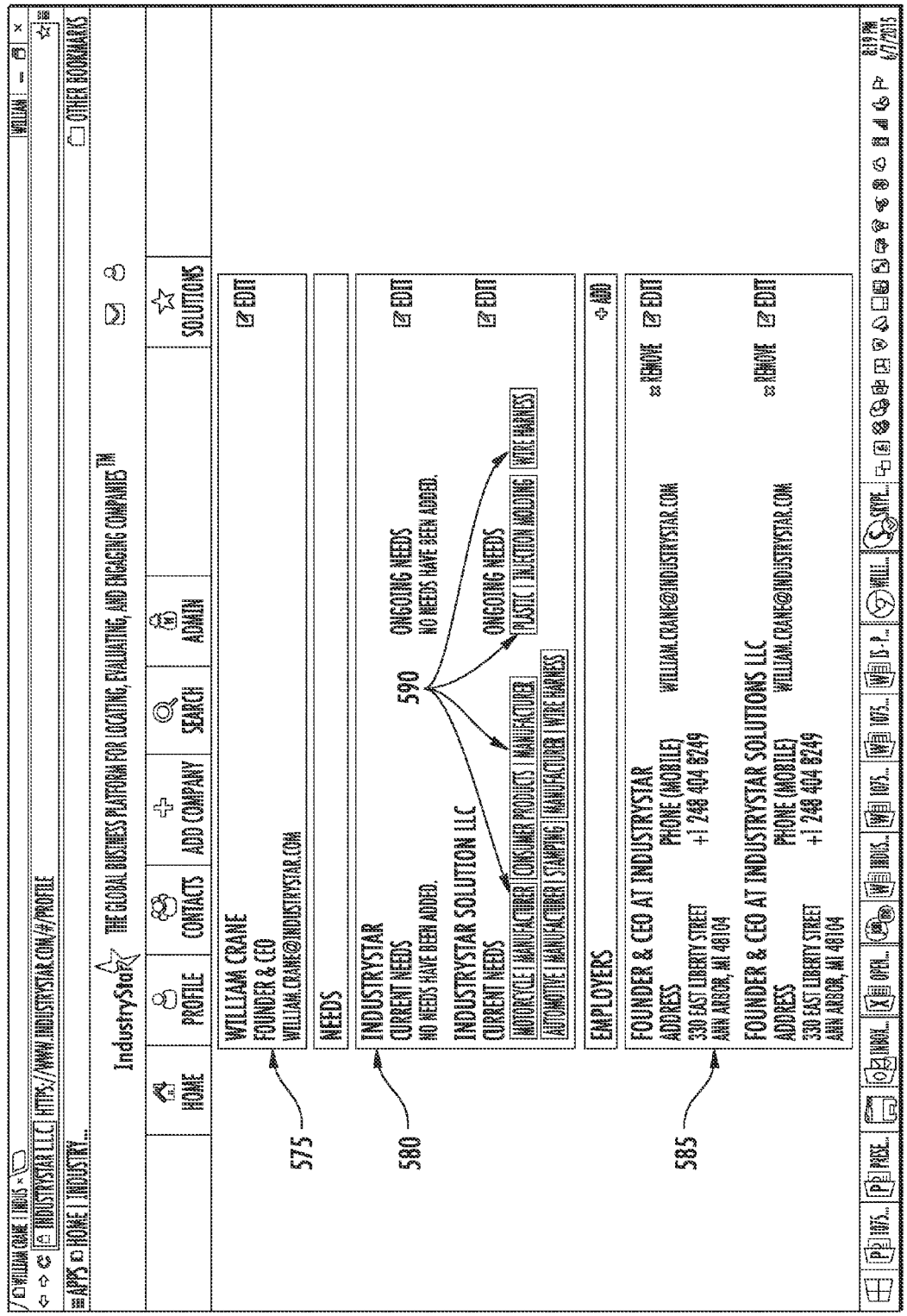
FIG. 5C is an illustration of a user profile display in accordance with an illustrative embodiment.

FIG. 5C is an illustration of a user profile display in accordance with an illustrative embodiment. According to other exemplary embodiments, additional, fewer, and/or different elements may be used. Also, FIG. 5C is meant to be illustrative only and is not meant to be limiting as to the layout or particular configuration of elements. A user profile display can display information of a user of the SCM system 105. The users can be, for example, employees of buyers or suppliers. As shown in FIG. 5C, a user profile display can include identification information section 575. The identification information section 575 can include information such as a user's name (e.g., William Crane), title (e.g., Founder & CEO), and contact information (e.g., william.crane@industrystar.com). The user profile display can also include a user needs section 580 that can identify the needs of the user and/or the user's employers (e.g., IndustryStar and IndustryStar Solutions LLC). The user needs section 580 can include one or more capability terms and/or capability term chains 590 (e.g., "motorcycle; manufacturer," "consumer products; manufacturer," "automotive; manufacturer; stamping," "manufacturer; wire harness," "plastic; injection molding," and "wire harness") indicating areas in which the user is seeking products. The user needs section 580 can indicate which needs are current needs (e.g., one-time needs) and which needs are ongoing needs. The user profile display can also include an employer identification section 585 that can identify which companies the user currently works for and/or which companies the user previously worked for. The employer identification section 580 can include the name of the company, the title the user has (or had) at the company, one or more addresses of the company, contact information of the company (e.g., phone number, email address, website), etc.

Figure 5D:
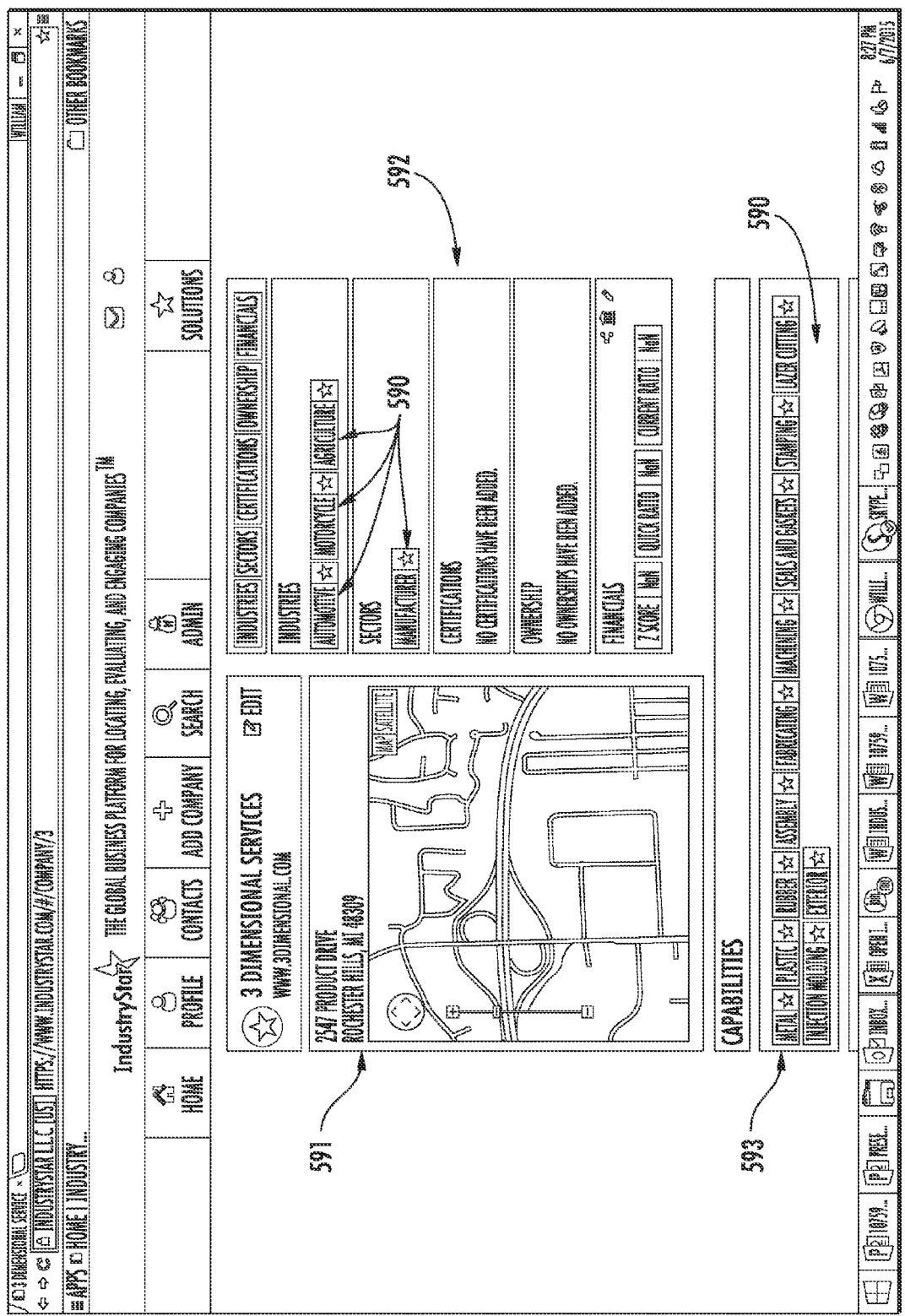
FIG. 5D is an illustration of a company profile display in accordance with an illustrative embodiment.

FIG. 5D is an illustration of a company profile display in accordance with an illustrative embodiment. According to other exemplary embodiments, additional, fewer, and/or different elements may be used. Also, FIG. 5D is meant to be illustrative only and is not meant to be limiting as to the layout or particular configuration of elements. A company profile page can include identification section 591 that can include identification information such as a company name (e.g., 3 Dimensional Services), contact information such as a website, address, phone number, email address, etc., and a map indicating one or more locations of the company. The company profile page can also include supplier information section 592 that can include sub-sections with identifying information such as industries, sectors, certifications, ownership, and financial information. Supplier information section 592 can use one or more capability terms and/or capability term chains 590 (e.g., "automotive," "motorcycle" and "agriculture" to identify the industries of the company and "manufacturer" to identify sectors of the company). Financial information can include one or more financial aspects of the company such as the Z-Score, the quick ratio, or the current ratio of the company. The company profile page also includes a capabilities section that lists capabilities of the company. The capabilities section can use one or more capability terms and/or capability term chains 590 (e.g., "metal," "plastic," "rubber," "assembly," "fabricating," "machining," "seals and gaskets," "stamping," "laser cutting," "injection molding," and "exterior").

Figure 5E:
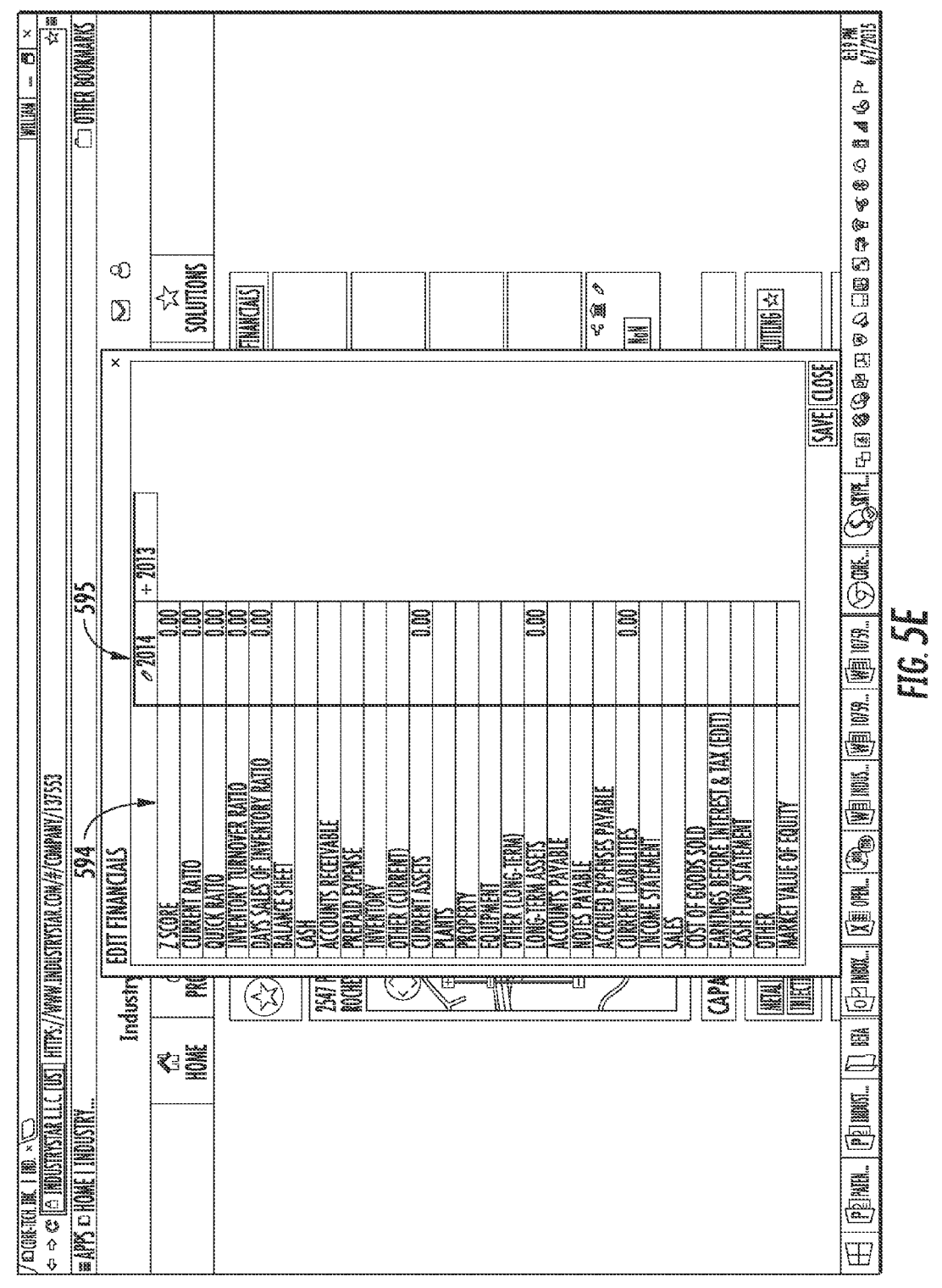

In some embodiments, one or more items of the company profile display can be selected by a viewer of the company profile display. Selecting an item can display greater detail of the item. For example, by selecting the company financial information item of the company profile display, greater detail of the company's financial information can be displayed. FIG. 5E is an illustration of a display of a company's financial information in accordance with an illustrative embodiment. According to other exemplary embodiments, additional, fewer, and/or different elements may be used. Also, FIG. 5D is meant to be illustrative only and is not meant to be limiting as to the layout or particular configuration of elements. As shown in FIG. 5D, a column of financial information aspects 594 can be shown and corresponding data for the aspects for a particular year (e.g., 2014) can be shown in column 595. Although FIG. 5D shows one year's information, any suitable number of years' information can be displayed in additional columns. The various financial information aspects can include a Z-Score, a current ratio, a quick ratio, an inventory turnover ratio, a day's sales of inventory ratio, a balance sheet, current assets, long-term assets, current liabilities, income statement, a cash flow statement, and/or other information such as a market value of equity. The balance sheet information can be broken down into aspects such as cash, accounts receivable, prepaid expenses, and inventory. The current assets can be broken down into aspects such as plants or manufacturing facilities, property, and equipment. The long-term assets can be broken down into aspects such as accounts payable, notes or other financial instruments payable, and accrued expenses payable. The income statement can be broken down into aspects such as sales, cost of goods sold, and earnings before interest and tax (EBIT).

In some embodiments, buyer-supplier matching 705 can include gathering buyer-supplier association information 815. Buyer-supplier association information can be information related to relationships between buyers and suppliers. Buyer-supplier association information can be gathered and/or received using any suitable method. For example, a database, list, repository, etc. can be maintained that keeps track of buyer-supplier associations, such as the buyer-supplier association database shown in FIG. 8A. Such a database can include information gathered from buyers who supply a list of current suppliers; information gathered from suppliers who provide a list of current buyers; pending buyer-supplier transactions; a history of a buyer who rated a supplier; a history of a supplier who rated a buyer; a buyer-supplier interaction history (e.g., via messages, emails, complaints); a buyer-supplier transaction history; etc. Such a database can include information gathered from buyers; suppliers; buyers' websites; suppliers' websites; electronic data exchanges using either non-standardized formats or standardized formats (e.g., electronic data interchange (EDI)); business intelligence providers (e.g., Covisint Corp.); industry associations; consultants; news organizations; governments; etc.

In some embodiments, buyer-supplier matching 705 can include gathering buyer preference information 820. Buyer preference information can include characteristics and/or features of a supplier and/or product that a buyer requires and/or prefers. For example, a buyer may not wish to use a supplier that already supplies the buyer's competitor. In another example, a buyer can require specific tolerances and/or manufacturing details. The buyer preference information can include buyers' need; volume; desired cost; desired quality; desired certifications; desired materials of construction; delivery location; desired rating of the supplier; desired delivery time; desired on-time delivery rating of the supplier; desired financial information of the supplier (e.g., minimum size of the supplier); desired ownership of the supplier; desired existing customers of the supplier; desired social considerations of the supplier (e.g., energy efficiency, pollution, labor, etc.); etc. In some embodiments, buyer-supplier matching 705 can include gathering supplier preference information similar to the buyer preference information.

In some embodiments, buyer preference information can include buyer information. Such buyer information can be stored in a database and/or repository, such as the buyer information database shown in FIG. 8A. The buyer information can include buyers' industries; sectors; certifications; location; rating; financial information; ownership; preference for specific suppliers (or types of suppliers); previous preference for product cost; previous preference for product quality; previous preference for supplier certifications; previous preference for supplier rating; previous preference for on-time delivery rating of a supplier; previous preference for desired supplier financial information; previous preference for desired supplier ownership; previous engagements with the supplier or another supplier; feedback about the buyer from a supplier (e.g., numerical rating and/or written); etc. In some embodiments, the buyer preference information database can include capability terms and/or capability term chains that the buyer is looking for in a supplier.

In some embodiments, buyer-supplier matching 705 can include gathering transportation cost information 825. Any suitable method of gathering transportation cost information can be used. Transportation costs can affect the net cost of a supplier's parts. For example, it may ultimately be cheaper for a buyer to obtain a part from a nearby supplier than from a distant supplier even though the per-unit cost of the nearby supplier is higher. That is, the cost to ship the products from the distant supplier to the buyer can be greater than the cost difference. In some embodiments, the transportation cost information can be stored in a database, a list, a repository, etc., such as the transportation cost database shown in FIG. 8A. The transportation cost information can include information from historical cost estimates leveraged from past quotes of suppliers; transportation providers; third party logistics providers (3PLs); transportation exchange websites such as FreightQuote.com; industry association reports; government data (e.g., gasoline prices, diesel prices, tariffs, etc.); etc.

In some embodiments, buyer-supplier matching 705 can include matching buyers and suppliers 830. Matching buyers and suppliers 830 can use some or all of the information gathered in operations 810-825. Matching buyers and suppliers 830 can include identifying the suppliers that best meet the buyer's needs and/or preferences. Similarly, matching buyers and suppliers 830 can include identifying the buyers that best meet the supplier's capabilities and/or preferences.

In some embodiments, matching buyers and suppliers 830 can include determining a matching score. The matching score can include a consideration as to whether a supplier has been endorsed, qualified, and/or approved by the buyer and whether the buyer has been endorsed, qualified, and/or approved by the seller. The matching score can be based on a comparison of the buyer's need and the supplier's capability; the buyer's volume of need and the supplier's capacity; the buyer's desired cost and the supplier's price; the buyer's desired quality and the supplier's quality; the buyer's desired certifications and the supplier's certifications; the buyer's location of need and the supplier's location and/or shipping capabilities; the buyer's desired supplier rating and the supplier's rating; the buyer's on-time delivery preference and the supplier's on-time delivery record; the buyer's desired supplier financial information and the supplier's financial information; the buyer's desired supplier ownership and the supplier's ownership; the buyer's industries and the supplier's industries; the buyer's sectors and the supplier's sectors; the buyer's previous preference of desired cost and the supplier's price; the buyer's previous preference of desired quality and the supplier's quality; the buyer's previous preference of desired certifications and the supplier's certifications; the buyer's previous preference of desired supplier rating and the supplier's rating; the buyer's previous on-time delivery preference and the supplier's on-time delivery record; the buyer's previous preference of desired supplier financial information and the supplier's financial information; the buyer's previous desired supplier ownership and the supplier's ownership; the supplier's desired buyer rating and the buyer's rating; the supplier's desired buyer financial information and the buyer's financial information; the supplier's desired buyer ownership and the buyer's ownership; capability terms and/or capability term chains of the supplier and capability terms and/or capability term chains of the buyer; etc. In some embodiments, the matching score can be based on other factors such as the buyer's preference for specific suppliers or types of suppliers.

In some embodiments, one or more of the factors (e.g., the comparisons) can be weighted, using any suitable method. In some embodiments, different weights can be applied to the various factors. In one embodiment, the weights of the various factors can be adjusted to increase accuracy of buyer-supplier matches. Adjustments to the weights may be made based on feedback from buyers and/or suppliers (e.g., which criteria are most important); metrics related to the success of matching buyers and suppliers; the nature of the particular industry; the time of year; the desired timing of delivery; etc. Such examples are merely illustrative. Other factors now known or later developed may be used to adjust the weight assigned to various factors.

In some embodiments, the weights applied to a buyer can be changed based on the weights of other buyers. That is, the weights of a buyer can be adjusted based on what similar buyers prefer. The other buyers can, for example, be in the same industry, in the same geographic region, etc. as the buyer. For example, SCM system 105 can determine that buyers in the botany industry are generally increasing the weight of products' price when matched to a supplier. In such an example, the product price weight for a buyer in the botany industry can be automatically increased to match the increase in weight of the industry in general. In another example, if buyers in Detroit, Mich., generally increase the weight of on-time delivery during winter months, the on-time delivery weight of a buyer in Detroit can be automatically increased by SCM system 105 during winter months.

For example, the comparison between a buyer's volume of need and a supplier's capacity can be assigned a relatively large weight. If a supplier's capacity is unable to fulfill a buyer's volume of need, the aggregate matching score can reflect that the match quality between the buyer and the supplier is low. Thus, the supplier can be ranked low for the buyer. In one embodiment, if a supplier's capacity is much larger than a buyer's volume of need, the aggregate matching score can reflect that the match quality between the buyer and the supplier is low. Thus, the supplier can be ranked low for the buyer. In such an example, the supplier can be ranked low for the buyer because the supplier may not be sufficiently motivated or willing to supply product to a buyer with a relatively low need. However, in some embodiments, a supplier can indicate to the system that the difference between the supplier's capability and the buyer's need is not an important factor to the supplier and the comparison can be weighted less when the supplier's capability exceeds the buyer's need. Similarly, in another example, a buyer may indicate that it is acceptable to purchase the same product from several suppliers. Thus, in such an example, the comparison between the supplier's capability and the buyer's needs can be weighted less.

In some embodiments, the matching score can be a difference score. In such an embodiment, the difference between a buyer's volume of need and a supplier's capacity can be high (e.g., a supplier cannot fulfill a buyer's volume of need or a buyer's need is much smaller than a supplier's capacity) thereby indicating that the match quality of the buyer and the supplier is low.

In some embodiments, a matching score can indicate a higher quality match based on previous engagements of a buyer with a supplier. For example, if a buyer previously purchased a product from the supplier, and the buyer is searching for a supplier for the product (or a different product), the matching score of the supplier for the buyer can be increased based on the previous purchase. Thus, in some embodiments, a preference can be made for suppliers (and/or buyers) who have an existing (or previous) relationship with the buyer (and/or supplier).

Figure 8B:
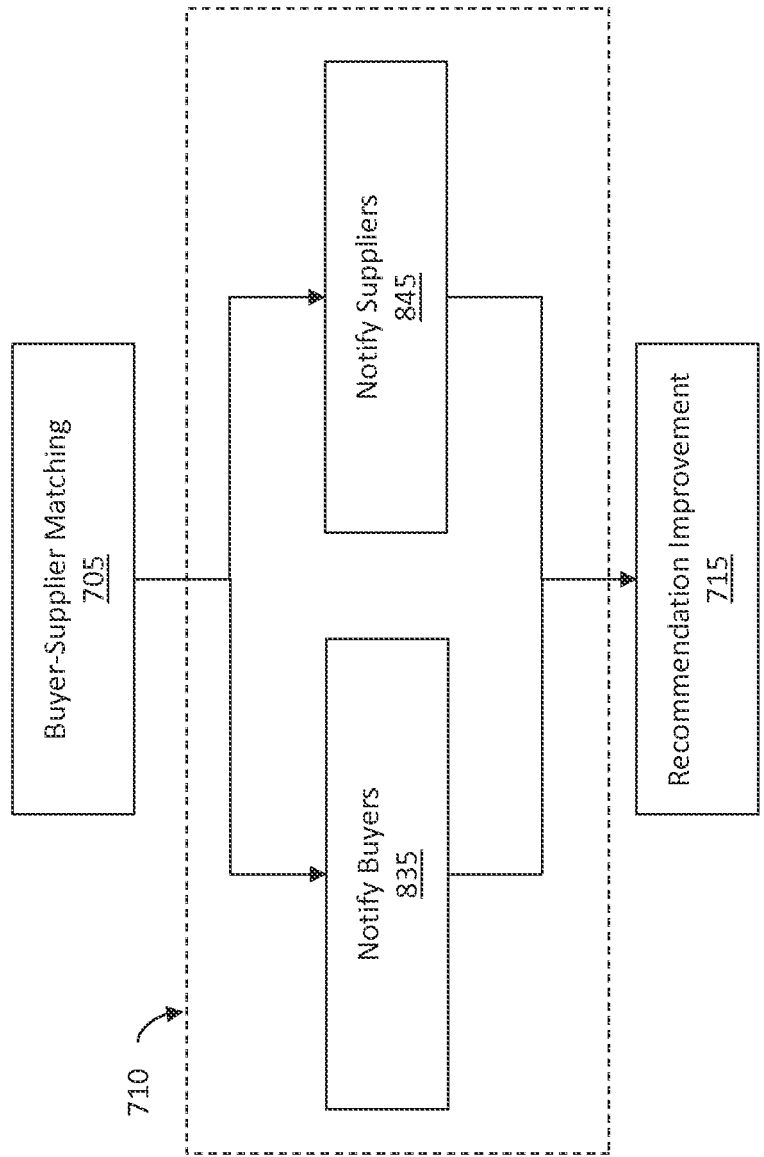
FIG. 8B is a flow diagram of a method for notifying users of a buyer-supplier match in accordance with an illustrative embodiment.

In some embodiments, buyer-supplier matching subsystem 115 can include notification 710. FIG. 8B is a flow diagram of a method for notifying users of a buyer-supplier match in accordance with an illustrative embodiment. According to other exemplary embodiments, additional, fewer, and/or different elements can be used. Also, the use of arrows or a flow diagram is not meant to be limiting with respect to the order or flow of operations. Notification 710 includes notifying buyers 835 and notifying suppliers 845.

In some embodiments, notifying buyers 835 can include notifying a buyer of a supplier with whom the buyer may be interested in establishing (or furthering) a relationship with. Similarly, in some embodiments, notifying suppliers 845 can include notifying a supplier of a buyer with whom the supplier may be interested in establishing (or furthering) a relationship with. Notification 710 can notify buyers and/or suppliers of matches using any suitable method. For example, notification 710 can include displaying matches next to a search result and/or as a search result; displaying the matches on the buyer's dashboard, home page, etc.; displaying a message on the supplier's information page when the buyer views the supplier's information page; displaying a message on the buyer's information page when the supplier views the buyer's information page; emailing the buyer and/or supplier; calling the buyer and/or supplier; sending a fax to the buyer and/or supplier; sending an SMS text message to the buyer and/or supplier; displaying the matches on a graphical information system (GIS) display; etc.

For each buyer, suppliers can be ranked based on the aggregate matching scores of the suppliers. Similarly, for each supplier, buyers can be ranked based on the aggregate matching scores of the buyers. In some embodiments, all matches can be presented to the buyer and/or supplier. In other embodiments, only some of the matches can be presented to the buyer and/or supplier. For example, the top ten matches can be presented. In another example, all matches with a matching score above a threshold can be presented.

Figure 8C:
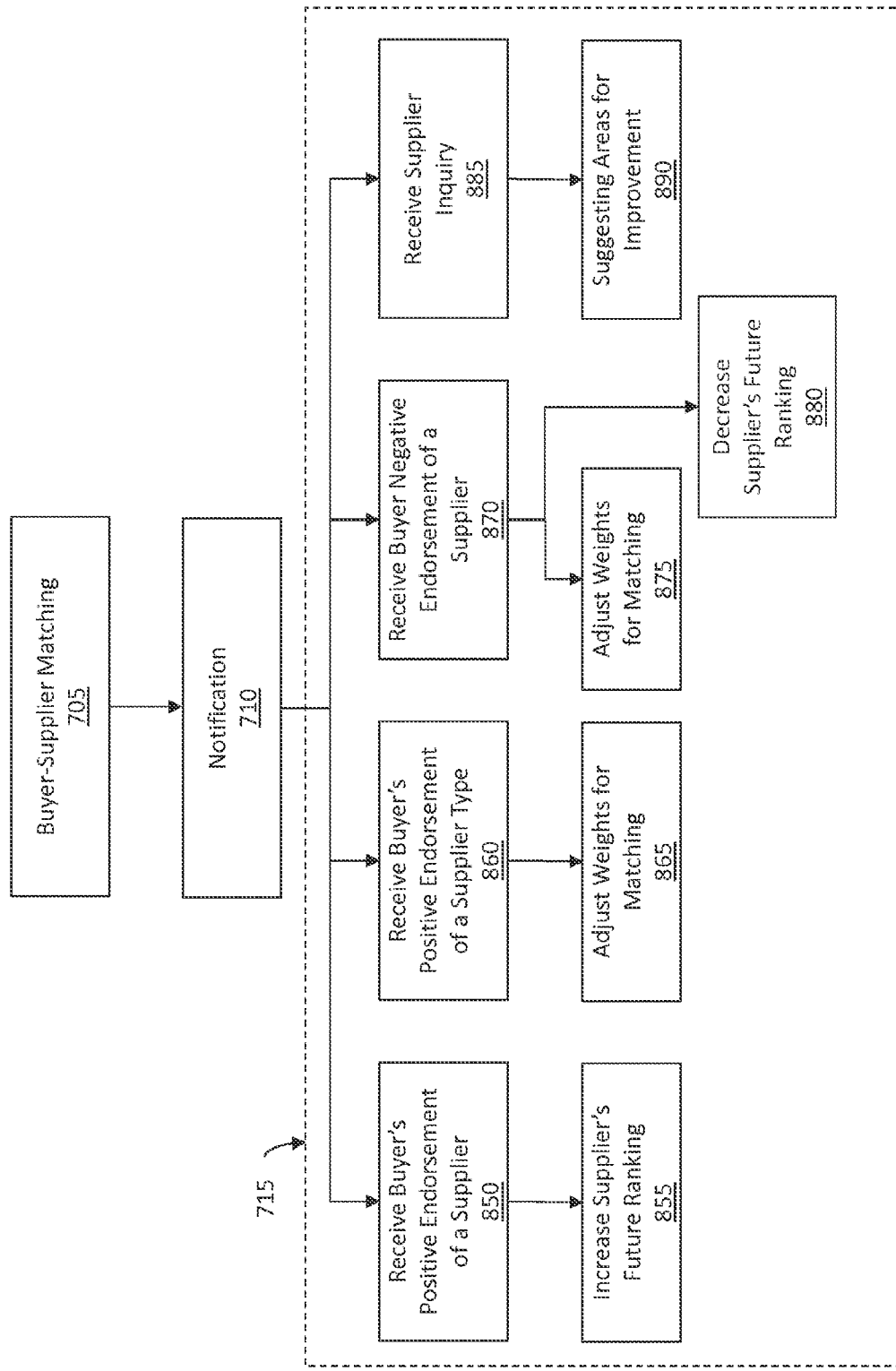
FIG. 8C is a flow diagram of a method for improving recommendations in accordance with an illustrative embodiment.
Figure 8D:
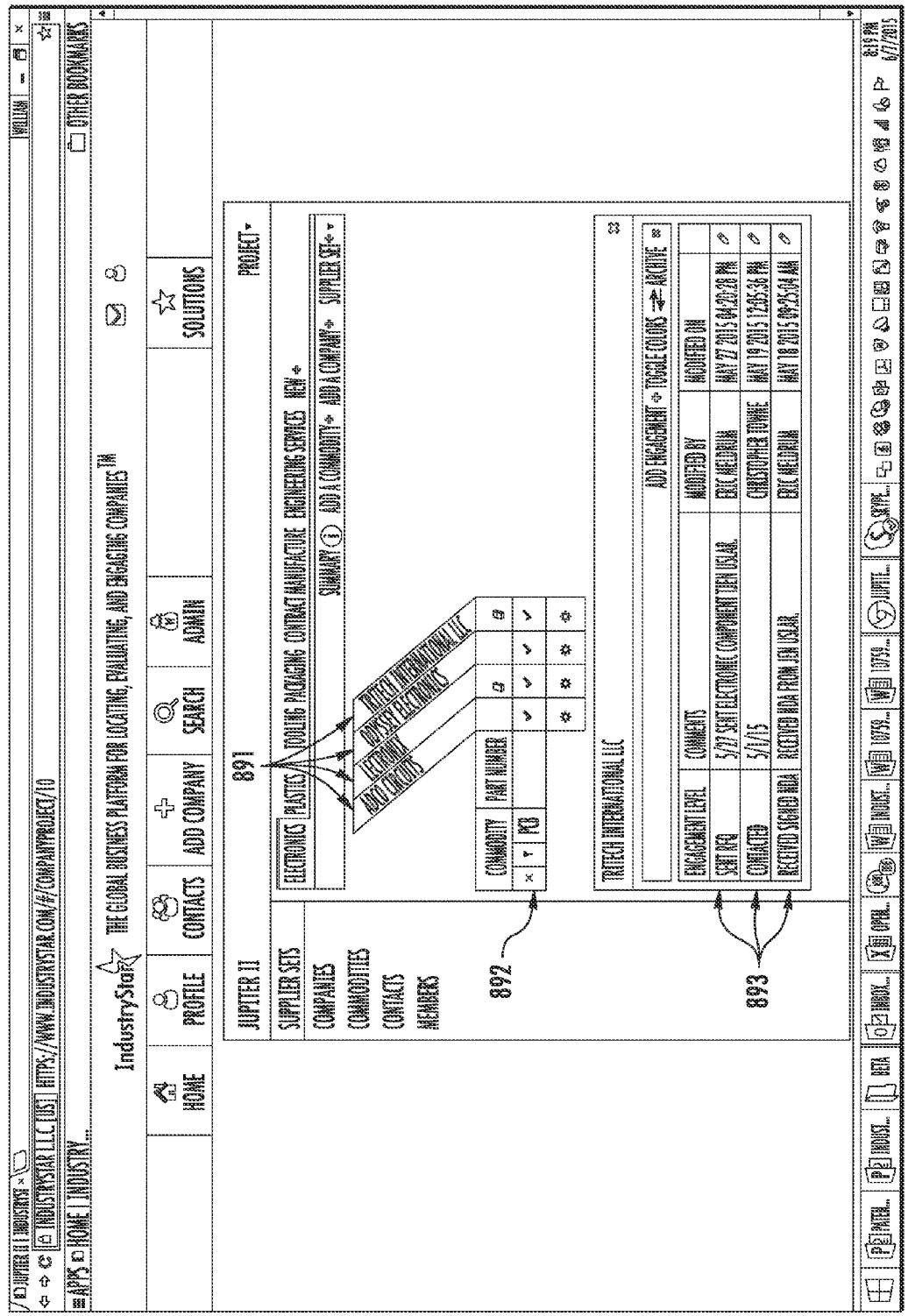
FIG. 8D is an illustration of a graphical representation of recommendations in accordance with an illustrative embodiment.

In some embodiments, notify buyers 835 and/or notify suppliers 845 can include a graphical representation of the recommendations. FIG. 8D is an illustration of a graphical representation of recommendations in accordance with an illustrative embodiment. According to other exemplary embodiments, additional, fewer, and/or different elements may be used. Also, FIG. 8D is meant to be illustrative only and is not meant to be limiting as to the layout or particular configuration of elements. Although FIG. 8D is an illustration of an example of displaying to a buyer a list of recommended suppliers, the features, layout, etc. can also be used to display to a supplier a list of recommended buyers. As shown in FIG. 8D, a graphical display of recommended suppliers includes a plurality of columns 891. Each column 891 can be used to display information regarding a particular recommended supplier. Although FIG. 8D illustrates displaying four recommended suppliers, any suitable number of recommended suppliers can be displayed. Additionally, although information regarding each supplier is contained in a column 891, rows can be used According to other exemplary embodiments (e.g., by swapping columns 891 with rows 892). Information in each column 891 can include the name of a supplier, which stage of communication the buyer and supplier are at (e.g., a communication such as an invitation was sent, a communication was received, a request for quote (RFQ) was sent, an RFQ was received, an RFQ was rejected, an RFQ was accepted, etc.), status information (e.g., whether a non-disclosure agreement has been executed, whether a memorandum of understanding has been executed, etc.), an indication of whether the supplier is capable of satisfying the buyer's needs, whether the supplier is at risk of being affected by a supply chain disruption event, etc. Such information can be displayed via text, icons, check marks, "X" symbols, color coding, etc.

As shown in FIG. 8D, the graphical display of recommended suppliers includes a row 892. According to other exemplary embodiments, a plurality of rows 892 can be displayed. Each row 892 can display information related to a need of the buyer, an aspect of a need of the buyer, a commodity, a part number, etc. The information displayed in each row 892 can include a name or description of the need of the buyer (or a part number, etc.) and an indication of whether each supplier can satisfy the need of the buyer.

The graphical display of recommended suppliers includes rows 893. Rows 893 can display the interaction history of the buyer and a selected supplier. The selected supplier can be chosen amongst the recommended suppliers. Each row 893 can include information of an interaction activity between the supplier and the buyer. The information can include the type of interaction (e.g., a communication such as an invitation was sent, a communication was received, an RFQ was sent, etc.), a timestamp of the interaction activity (e.g., of when the entry was last modified), an identification of one or more acting individuals (e.g., who sent the message, who accepted the RFQ, etc.), comments or notes, a description of the interaction activity, etc.

In some embodiments, suppliers can provide a bid for a buyer's needs. For example, potential buyers for a supplier can be identified and the supplier can be notified of such potential buyers. In some embodiments, the needs of a buyer are made available to all users of SCM system 105. The supplier can review the needs of the buyer, and provide a bid to the buyer to satisfy the buyer's need. In such an example, the potential buyers need not send a request for a quotation or bid to the supplier. Rather, the supplier can find potential buyers (e.g., via buyer-supplier matching subsystem 115) and provide bids to the potential buyers in response to the potential buyers being identified as potential buyers or recommended buyers.

In some embodiments, buyer-supplier matching subsystem 115 can include recommendation improvement 715. FIG. 8C is a flow diagram of a method for improving recommendations in accordance with an illustrative embodiment. According to other exemplary embodiments, additional, fewer, and/or different elements may be used. Also, the use of arrows and a flow diagram is not meant to be limiting with respect to the order or flow of operations. Recommendation improvement 715 includes receiving a buyer's positive endorsement of a supplier 850, increasing the supplier's future ranking 855, receiving a buyer's positive endorsement of a supplier type 860, adjusting weights for matching 865, receiving a buyer's negative endorsement of a supplier 870, adjusting weights for matching 875, decreasing the supplier's future ranking 880, receiving a supplier inquiry, and suggesting areas for improvement 890.

Recommendation improvement 715 can adjust weights of comparisons and/or factors used in determining matches in buyer-supplier matching 705 to improve the matches presented to buyers and/or suppliers. In some embodiments, feedback from a buyer and/or a supplier can be received. The feedback can be related to a supplier (or a buyer) that was recommended to and/or matched with the buyer (or the supplier). Based on the feedback, the weights of the considerations can be adjusted such that future matches and/or recommendations are improved. Accordingly, in some embodiments, the more buyer-supplier matching subsystem 115 is used, the matches or recommendations can be improved because more information is available to identify the most appropriate buyer or supplier.

For example, if a buyer provides a positive endorsement (e.g., provides a positive review or positive feedback) a supplier that was recommended to the buyer (operation 850), then the supplier's ranking can be increased in future matches (operation 855). In some embodiments, the supplier's ranking can be increased with regard to the buyer that liked the supplier. According to other exemplary embodiments, the supplier's ranking can be increased with regard to all potential buyers. In another example, a buyer can provide a positive endorsement (e.g., provide a positive review or positive feedback) multiple suppliers and/or a type of supplier (operation 860). In some embodiments, recommendation improvement 715 can identify one or more features that the multiple suppliers share and the weight of such features can be increased in future matching score calculations (operation 865). In another embodiment, the buyer can identify one or more features that the buyer likes (operation 860) and the weight of such features can be increased in future matching score calculations (operation 865). In some embodiments, a positive endorsement can include a buyer qualifying and/or approving a seller. If a supplier has been qualified or approved by a buyer, the supplier can be ranked higher than a supplier that has not been qualified or approved by the buyer. In some embodiments, a supplier that has been approved can be ranked higher than a supplier that has been qualified.

Similarly, if a buyer provides a negative endorsement (e.g., provides a negative review or negative feedback) a supplier that was recommended to the buyer (operation 870), then the supplier's ranking can be decreased in future matches (operation 880). In some embodiments, the supplier's ranking can be decreased with regard to the buyer that liked the supplier. According to other exemplary embodiments, the supplier's ranking can be decreased with regard to all potential buyers.

In another example, a buyer can provide a negative endorsement (e.g., provide a negative review or negative feedback) multiple suppliers and/or a type of supplier. In some embodiments, recommendation improvement 715 can identify one or more features that the multiple suppliers share and the weight of such features can be decreased in future matching score calculations. In another embodiment, the buyer can identify one or more features that the buyer dislikes and the weight of such features can be decreased in future matching score calculations (operation 875). Although the above examples include buyers liking or disliking suppliers, the same examples can apply to suppliers liking or disliking buyers in rankings of buyers for suppliers. Further, although the above examples include buyers liking or disliking suppliers that have been previously recommended, the same examples can apply to suppliers (or buyers) that have not been previously recommended to the buyer.

In some embodiments, receive supplier inquiry 885 can include a supplier inquiring into the number of recommendations of the supplier that are made to buyers. For example, a supplier's amount of new customers can decrease while the supplier's competitors' amount of new customers can increase. The supplier can inquire as to why the supplier is not being recommended as often as its competitors. In such embodiments, the components that make up the matching score of the supplier (e.g., the comparisons between the supplier and the buyer, the weights, reviews, etc.) can be compared to the matching scores of the supplier's competitors. After the comparison of matching scores, the system can notify the supplier of areas in which the supplier's competitors score better than the supplier (operation 890). Such areas can be areas in which the supplier can improve to gain more recommendations in the future. In some embodiments, the system can automatically identify for suppliers (and/or buyers) areas in which to improve to increase its ranking. In some embodiments, the supplier's (and/or the buyer's) matching score and/or matching score components can be displayed to the supplier via, e.g., a dashboard view, a home screen, etc.

In some embodiments, SCM system 105 can include a supply chain management system that incorporates a crowd-sourced capability rating subsystem that can leverage data from a plurality of system users to crowd-source buyer and supplier capability ratings. Such a supply chain management system provides advantages over traditional formats in which individual companies maintained information on, and rated, other companies using their own interactions. Using a crowd-sourced capability-rating subsystem, even if a buyer is seeking to engage a supplier in an industry in which the buyer had never previously engaged, the buyer can have access to relevant information about the capabilities of the supplier without engaging in a trial-and-error approach to finding the most suitable suppliers.

Figure 9:
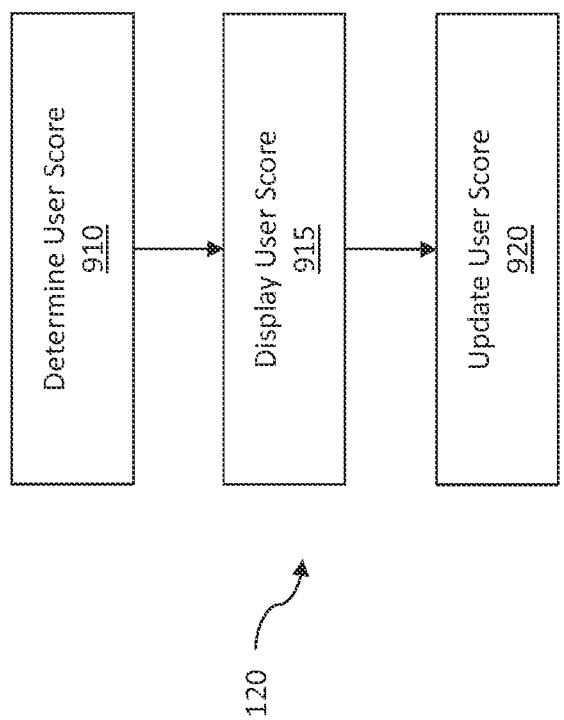
FIG. 9 is a flow diagram of a rating subsystem in accordance with an illustrative embodiment.

FIG. 9 is a flow diagram of a rating subsystem in accordance with an illustrative embodiment. According to other exemplary embodiments, additional, fewer, and/or different elements may be used. Further, the use of arrows is not meant to be limiting with respect to the order or flow of operations. The rating subsystem 120 can include determining user scores 910, displaying user scores 915, and updating user scores 920. In some embodiments, operations 910-920 are performed simultaneously and/or constantly.

In some embodiments, the rating subsystem 120 can be a crowd-sourced rating system. That is, users (e.g., buyers and suppliers) can be rated based on input from a plurality of sources. In some embodiments, the plurality of sources can include other users. The user ratings can be based on numerical scores and/or written reviews. In some embodiments, user ratings can be based using only trusted sources, such as buyers and suppliers with a confirmed identity. In some embodiments, only other users that have a relationship with a rated user can contribute to the user's rating. In yet other embodiments, any suitable source of information can be used to rate users.

Figure 10A:
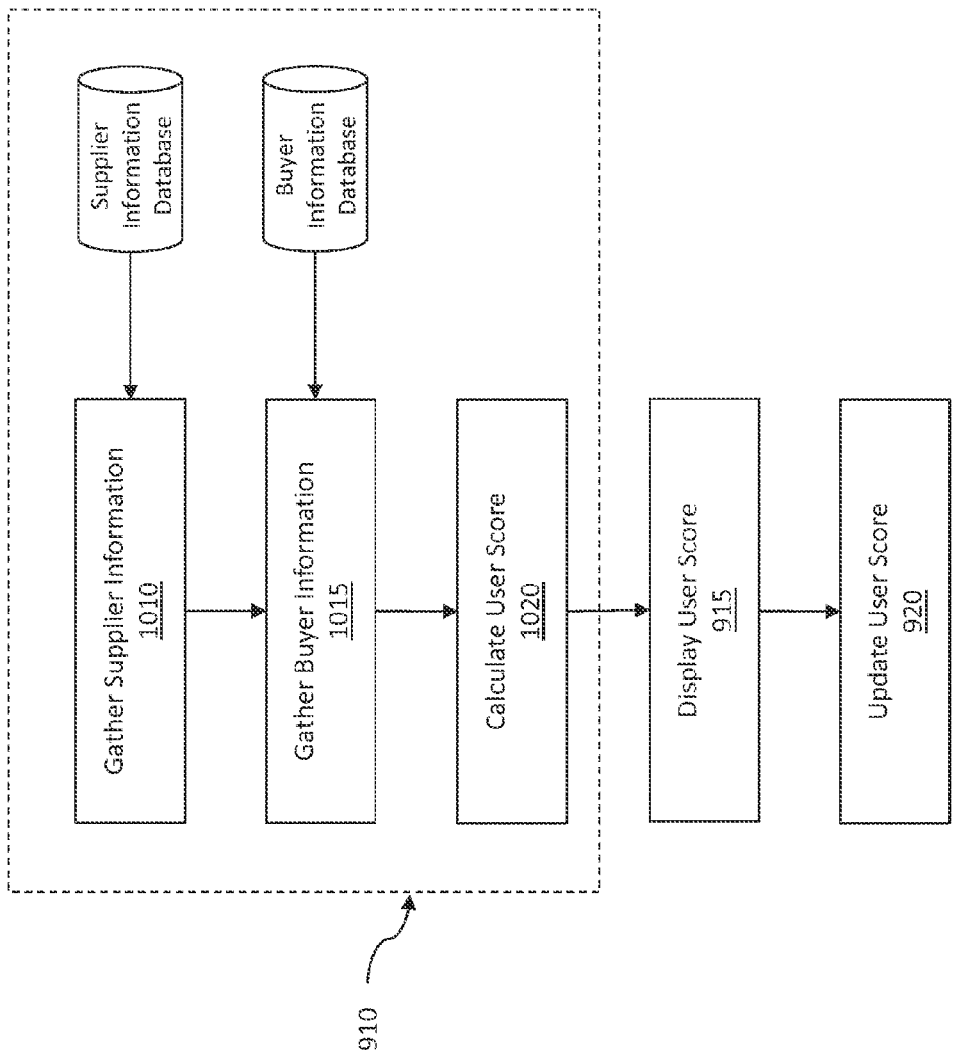
FIG. 10A is a flow diagram for calculating user scores in accordance with an illustrative embodiment.

FIG. 10A is a flow diagram of a method for calculating user scores in accordance with an illustrative embodiment. According to other exemplary embodiments, additional, fewer, and/or different elements may be used. Further, the use of arrows is not meant to be limiting with respect to the order or flow of operations. Determining user scores 910 can include gathering supplier information 1010, gathering buyer information 1015, and calculating user scores 1020.

Gathering supplier information 1010 can include gathering, retrieving, and/or receiving information regarding a supplier. Any suitable method can be used to gather supplier information. For example, a supplier information database and/or repository can be used to store supplier information, such as the supplier information database shown in FIG. 10A. In some embodiments, the supplier information database of FIG. 10A is the same as the supplier information database of FIG. 8A. Such a database can include information about one or more suppliers including suppliers' industries; sectors; capability; capacity; product price; quality; certifications; tooling; equipment; location; on-time delivery record; financial information; ownership information; desired buyer rating; desired buyer financial information; desired buyer ownership; previous engagements; feedback from buyers (e.g., numerical rating and/or written); etc. Such a database can include information gathered from buyers; suppliers; buyers' websites; suppliers' websites; electronic data exchanges using either non-standardized formats or standardized formats (e.g., electronic data interchange (EDI)); business intelligence providers (e.g., Covisint Corp.); industry associations; consultants; news organizations; governments; etc. In some embodiments, information regarding the suppliers of a supplier can be included in the supplier information database. For example, second, third, etc. tier supplier information can be used to determine a first tier supplier's score. Thus, in some embodiments, if a supplier uses risky suppliers itself, the supplier can receive a lower score.

Gathering buyer information 1015 can include gathering, retrieving, and/or receiving information regarding a buyer. Any suitable method can be used to gather buyer information. For example, a buyer information database and/or repository can be used to store buyer information, such as the buyer information database shown in FIG. 10A. In some embodiments, the buyer information database of FIG. 10A is the same as the buyer information database of FIG. 8A. Such a database can include information about one or more buyers including buyers' need; volume; desired cost; desired quality; desired certifications; desired materials of construction; delivery location; delivery time requirement; desired on-time delivery rating of the supplier; desired financial information of the supplier (e.g., minimum size of the supplier); desired ownership of the supplier; existing customers of the supplier; desired social considerations of the supplier (e.g., energy efficiency, pollution, labor, etc.); purchase order history; suppliers the buyers have worked with; feedback from suppliers; etc. Such information can include historical information (e.g., buyers' past need) and current information (e.g., buyers' current need).

In some embodiments, either gathering supplier information 1010 or gathering buyer information 1015 can be performed. Similarly, in some embodiments, gathering supplier information 1010 and/or gathering buyer information 1015 can include gathering information on a single user. In some embodiments, gathering supplier information 1010 and gathering buyer information 1015 can occur simultaneously, constantly, and/or periodically.

Calculating user scores 1020 can including determining a rating of a user. One or more user scores can be calculated using the information gathered about the user. The range of numbers for a particular score (e.g., equipment or tooling) can be any suitable range. In some embodiments, all scores have the same possible range, but can have different weights. In other embodiments, scores can have different ranges. In some embodiments, each user can have one or more ratings. Some types of ratings can include a capability score, a capacity score, a quality score, an on-time delivery score, a price score, a financial score, an overall (e.g., aggregate) score, etc. In some embodiments, calculating user scores 1020 can include calculating scores of multiple users. In some embodiments, a user score can include a numerical score, a percentile score, and/or a written score (e.g., a written review, a description, etc.). In some instances, the written reviews, descriptions, etc. can increase a user rating score by a determined amount (e.g., ten points, one point, 0.1 points, 0.01 points, etc.) for a positive review and can decrease the user rating score by the same determined amount or a different determined amount for negative reviews. In such embodiments, neutral reviews may not affect the user rating score. In some instances, automatic systems can be used to analyze the text of written reviews or descriptions to determine whether the written review or description is positive, negative, or neutral. In other embodiments, the user submitting the written review or description can provide whether the review is positive, negative, or neutral.

A user score can be calculated using information from multiple sources. Thus, in some embodiments, the user score can be determined using crowd-sourcing. The weight of the information from the sources can be different depending upon the type of information and/or the source. For example, when calculating an on-time delivery score of a supplier, information gathered from the supplier's website regarding its own on-time delivery record can be weighted less than information gathered from buyers who have given feedback regarding whether deliveries from the supplier were on time. In another example, feedback regarding a supplier from buyers with a verified identity can be weighted higher than feedback regarding the supplier from buyers whose identity has not been verified. Similarly, in some embodiments, feedback regarding a supplier from a buyer whose purchase from the supplier can be verified can be weighted higher than feedback regarding the supplier from a buyer whose purchase from the supplier is not verified.

In some embodiments, information considered when calculating a score can be weighted based on time. For example, older information can be weighted less than newer information. In some embodiments, an overall user score can be calculated by combining various other scores of the user. In such embodiments, the various other scores of the user can be weighted differently. In some embodiments, the weights of the various other scores used to calculate an overall user score can be the same for all users. For example, a price score can be 30% of an overall score for all users (or all buyers, all suppliers, or any subset thereof). According to other exemplary embodiments, the weights of the various scores used to calculate an overall score are the same for all users within a group. For example, the weights for calculating overall scores can be the same for all automotive buyers whose revenue is greater than $4 million per year. In such an example, the weights used to calculate the overall scores of automotive buyers whose revenue is greater than $4 million per year can be different than the weights used to calculate the overall scores of chemical manufacturers whose revenue is greater than $50 billion per year.

In some embodiments, the rating subsystem 120 can include displaying user scores 915. In some embodiments, one or more of each user's scores can be displayed. In some embodiments, only one score (e.g., a user's overall score) is displayed. A user's score can be displayed in any suitable manner. For example, a user's score can be displayed next to the user's name in a list (e.g., search results, rankings, etc.); on the user's information (e.g., profile) page; on the user's dashboard and/or home screen; on a geographical information system (GIS) display; etc.

Figure 10B:
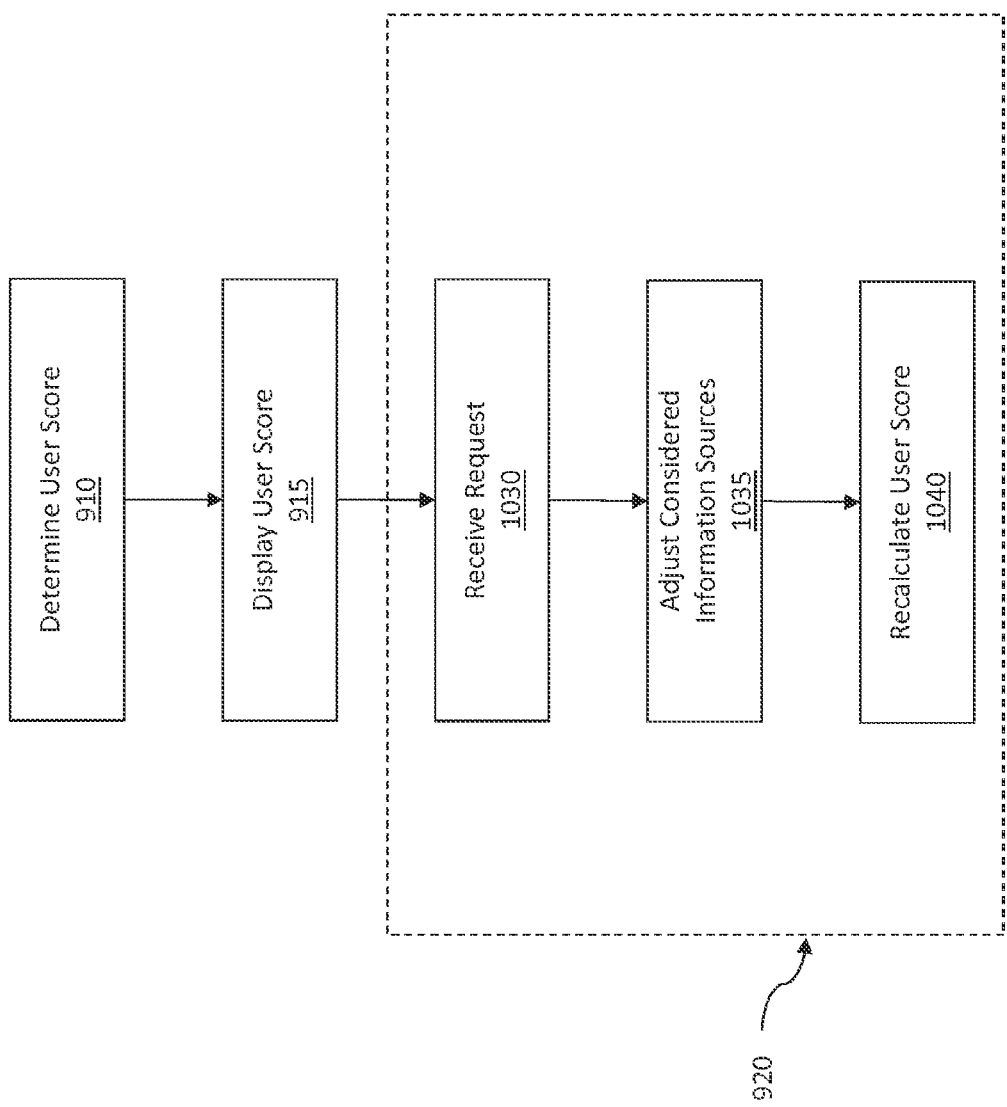
FIG. 10B is a flow diagram of a method of updating a user's score in accordance with an illustrative embodiment.

In some embodiments, the rating subsystem 120 can include updating a user's score 920. FIG. 10B is a flow diagram of a method of updating a user's score in accordance with an illustrative embodiment. According to other exemplary embodiments, additional, fewer, and/or different elements may be used. Also, the use of arrows and a flow diagram is not meant to be limiting with respect to the order or flow of operations. Updating a user's score 920 includes receiving a request 1030, adjusting considered information sources 1035, and recalculating user scores 1040.

In some embodiments, updating a user's score can include re-determining the user's score via operation 910. In some embodiments, updating a user's score can include dispute resolution. For example, receiving a request 1030 can include receiving an indication that a user disputes its score. In such an example, the disputed of the score can include a general dispute (e.g., a score is too low) or can include a specific dispute (e.g., a source used to determine the user's score should not have been used). Based on the indication that the user disputes its score, one or more changes can be made, and the user's score can be re-determined. For example, adjusting considered information sources 1035 can include adding and/or removing sources of information from the pool of information used to determine the user's score. In some embodiments, the changes can include adjustments to weights used to calculate the user's score. The changes can be made automatically or can be made by a system administrator. In some embodiments, any and/or all changes can be approved by a system administrator.

For example, a supplier can dispute its on-time delivery score. The supplier can identify a source of information, such as a bad review, that the supplier suggests should not be considered in determining the on-time delivery score. For example, the bad review can be made from a user that has never purchased a product from the supplier and, thus, has no basis for its bad review of the supplier. The bad review can then be eliminated from the information used to determine the on-time delivery score and the on-time delivery score can be re-calculated in recalculate user score 1040.

Figure 11:
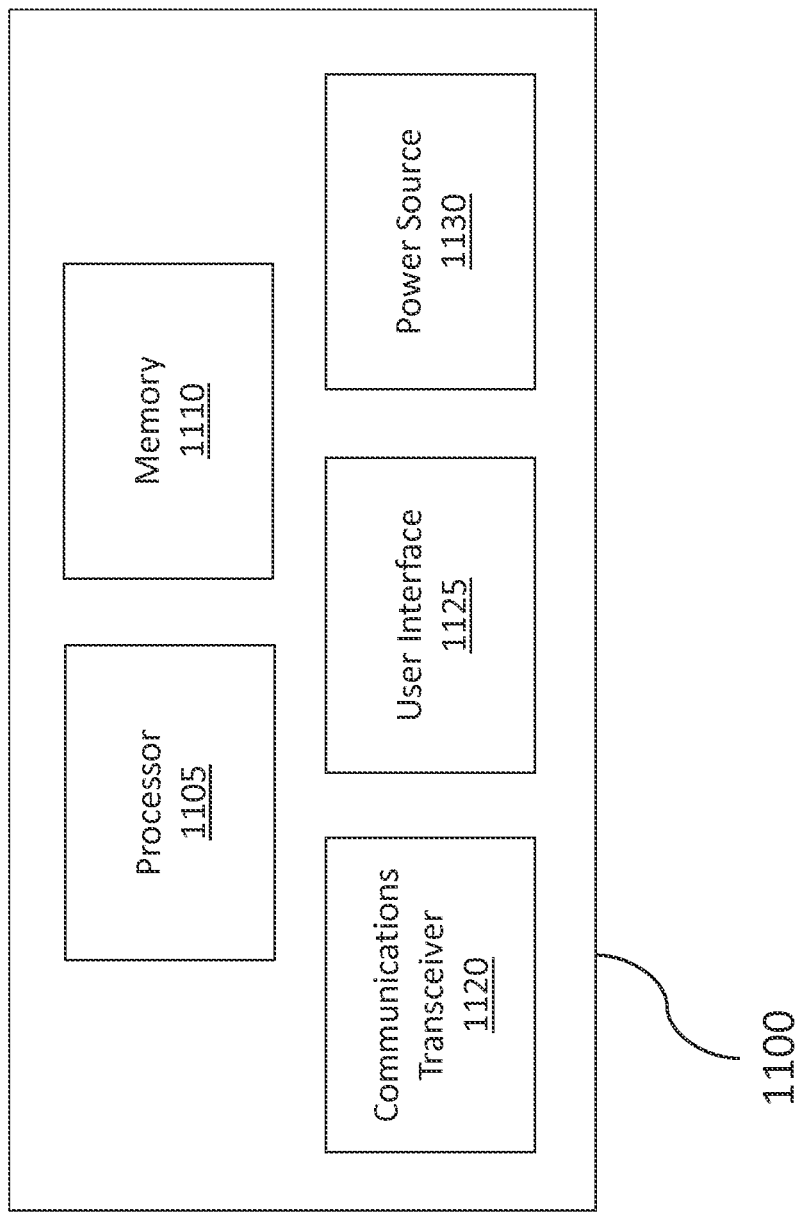
FIG. 11 is a block diagram of a controller in accordance with an illustrative embodiment.

FIG. 11 is a block diagram of a controller in accordance with an illustrative embodiment. According to other exemplary embodiments, additional, fewer, and/or different elements may be used. A controller 1100 can include a processor 1105, a memory 1110, a communications transceiver 1120, a power source 1130, and a user interface 1125. The SCM system 105 can include one or more controllers 1100.

In some embodiments, controller 1100 can include processor 1105. Processor 1105 can be configured to carry out and/or cause to be carried out one or more operations described herein. Processor 1105 can execute instructions as known to those skilled in the art. The instructions may be carried out by one or more special purpose computers, logic circuits (e.g., programmable logic circuits (PLC)), and/or hardware circuits. Thus, processor 1105 may be implemented in hardware, firmware, software, or any combination of these methods. The term "execution" is the process of running an application or the carrying out of the operation called for by an instruction. The instructions may be written using one or more programming language, scripting language, assembly language, etc. Processor 1105 executes an instruction, meaning that it performs the operations called for by that instruction. Processor 1105 operably couples with memory 1110, communications transceiver 1120, power source 1130, user interface 1125, etc. to receive, to send, and to process information and to control the operations of the controller 1100. Processor 1105 may retrieve a set of instructions from a permanent memory device such as a read-only memory (ROM) device and copy the instructions in an executable form to a temporary memory device that is generally some form of random access memory (RAM). Controller 1200 may include a plurality of processors that use the same or a different processing technology. In an illustrative embodiment, the instructions may be stored in memory 1110.

In some embodiments, controller 1100 can include memory 1110. Memory 1110 can be an electronic holding place or storage for information so that the information can be accessed by processor 1205 using any suitable method. Memory 1110 can include, but is not limited to, any type of random access memory (RAM), any type of read-only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. Controller 1100 may have one or more computer-readable media that use the same or a different memory media technology. Controller 1100 may have one or more drives that support the loading of a memory medium such as a CD, a DVD, a flash memory card, etc.

In some embodiments, controller 1100 can include a communications transceiver 1120. Communications transceiver 1120 can be configured to receive and/or transmit information. In some embodiments, communications transceiver 1120 can communicate information via a wired connection, such as an Ethernet connection, one or more twisted pair wires, coaxial cables, fiber optic cables, etc. In some embodiments, communications transceiver 1120 can communicate information via a wireless connection using microwaves, infrared waves, radio waves, spread spectrum technologies, satellites, etc. Communications transceiver 1120 can be configured to communicate with another device using cellular networks, local area networks, wide area networks, the Internet, etc. In some embodiments, one or more of the elements of controller 1100 communicate via wired or wireless communications.

In some embodiments, controller 1100 can include power source 1130. Power source 1130 can be configured to provide electrical power to one or more elements of controller 1100. In some embodiments, power source 1130 can include an alternating power source, such as available line voltage (e.g., 120 Volts (V) alternating current at 60 Hertz in the United States). Power source 1130 can include one or more transformers, rectifiers, etc. to convert electrical power into power useable by the one or more elements of controller 1100, such as 1.5 V, 8 V, 12 V, 24 V, etc. Power source 1130 can include one or more batteries.

In some embodiments, controller 1100 can include user interface 1125. User interface 1125 can be configured to receive and/or provide information from/to a user, such as a system administrator, a buyer, a supplier, etc. User interface 1125 can be any user interface known in the art. User interface 1125 can be an interface for receiving user input and/or machine instructions for entry into controller 1100 using any suitable method. User interface 1125 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into controller 1100. User interface 1125 can be used to navigate menus, adjust options, adjust settings, adjust display, etc. User interface 1125 can be configured to provide an interface for presenting information from controller 1100 to external systems, users, or memory. For example, user interface 1125 can include an interface for a display, a printer, a speaker, alarm/indicator lights, a network interface, a disk drive, a computer memory device, etc. User interface 1125 can include a color display, a cathode-ray tube (CRT), a liquid crystal display (LCD), a plasma display, an organic light-emitting diode (OLED) display, etc.

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and an I/O device, e.g., a mouse or a touch sensitive screen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for managing a supply chain performed by a supply chain management server comprising:
monitoring, by a computing system, supply chain disruption event information from a plurality of data sources in real-time, wherein the monitoring comprises receiving information related to operations of a first supplier from the plurality of data sources, and wherein the first supplier is responsible for providing a first product that satisfies criteria of a buyer;
based on the supply chain disruption event information, determining, by the computing system, a risk value that indicates a risk level of disruption of the operations of the first supplier;
flagging, by the computing system, the first supplier within a database of potential suppliers in response to determining that the determined risk value is greater than a risk tolerance threshold;
notifying, by the computing system, the buyer that the first supplier has been flagged;
providing, by the computing system, a list of recommended suppliers to the buyer on a graphical display device in response to determining that the determined risk value is greater than the risk tolerance threshold, wherein the recommended suppliers are each capable of providing a respective second product to the buyer, wherein each of the respective second products satisfies the criteria of the buyer; and
automatically soliciting, by the computing system, bids from one or more suppliers on the list of recommended suppliers in response to determining that the determined risk value is greater than the risk tolerance threshold.

2. The method for managing the supply chain of claim 1, wherein said notifying the buyer comprises indicating to the buyer that the first supplier is at risk of failing to deliver the first product to the buyer before a previously agreed-upon delivery date.

3. The method of claim 1, further comprising notifying a prospective buyer that the first supplier has been flagged, wherein the prospective buyer has not previously purchased the first product from the first supplier.

4. The method of claim 3, wherein said notifying the prospective buyer that the first supplier has been flagged comprises displaying an icon in a list of potential suppliers, wherein the list of potential suppliers comprises the first supplier, and wherein the icon indicates that the first supplier is at risk of failing to deliver the first product before a preferred date of the prospective buyer.

5. The method of claim 1,
wherein the supply chain disruption event information indicates that the supply chain disruption event occurred, wherein the supply chain disruption event impacts an ability of the first supplier to provide the first product to the buyer on time, wherein the supply chain disruption event will prevent the first supplier from delivering the first product to the buyer on time, and wherein said determining the risk value comprises:
assigning each of the plurality of sources a weight corresponding to a reliability level of the respective source, wherein the reliability level indicates a reliability of the respective source to report accurately; and
summing the weights of each of the plurality of sources, and
wherein said flagging the first supplier is responsive to the supply chain management server determining that the sum of the weights of each of the plurality of sources is above the risk tolerance threshold.

6. The method of claim 5, further comprising determining which of the plurality of sources indicates that the supply chain disruption event occurred.

7. The method of claim 1, further comprising:
receiving buyer preference information;
receiving buyer-supplier association information that indicates relationships between the buyer and one or more of the potential suppliers;
receiving transportation cost information that indicates transportation costs of the respective second products from locations of the potential suppliers and a location of the buyer; and
determining the list of recommended suppliers based on the information, the buyer preference information, the buyer-supplier association information, and the transportation cost information, wherein the list of recommended suppliers comprises at least one supplier of the potential suppliers.

8. The method of claim 7, wherein said determining the list of recommended suppliers comprises:
comparing buyer preferences of the buyer preference information with respective supplier capabilities of the information to determine a plurality of difference scores;
determining a previous relationship score based on a previous relationship between the buyer and the first supplier indicated in the buyer-supplier association information;
determining a transportation cost score based on a cost to transport the respective second products from a location of the first supplier to the location of the buyer;
summing the plurality of difference scores, the previous relationship score, and the transportation cost score, wherein each of the plurality of difference scores, the previous relationship score, and the transportation cost score are weighted based on relevance to the buyer; and
determining that the recommended suppliers are each capable of providing the respective second product to the buyer based on the sum of the plurality of difference scores for each of the suppliers.

9. The method of claim 1, further comprising:
receiving feedback regarding the first supplier, wherein the feedback was received from a plurality of buyers;
calculating a plurality of sub-scores based on the information and the feedback, wherein each sub-score relates to an aspect of the first supplier;
calculating an aggregate score based on the plurality of sub-scores, wherein each sub-score is weighted based on relevance of the respective aspect to one or more second buyers; and
ranking the first supplier among the recommended suppliers based on the aggregate score.

10. The method of claim 9, wherein the plurality of buyers each have a confirmed identity and each have been confirmed to be customers of the first supplier.

11. The method of claim 9, further comprising displaying, on the graphical display device, the list of recommended suppliers in an order based on an aggregate score for each of the recommended suppliers.

12. A system for managing a supply chain comprising:
a communications transceiver configured to communicate with a plurality of buyers and a plurality of suppliers;
a memory configured to store a database of supplier information, a database of disruption event information, and a database of the plurality of suppliers, wherein the supplier information relates to operations of a first supplier, wherein the first supplier is responsible for providing a first product that satisfies criteria of a buyer, and wherein the disruption event information comprises information indicating disruption of the operations of the first supplier of the plurality of suppliers; and
a processor operatively coupled to the communications transceiver and the memory, wherein the processor is configured to:
monitor the supplier information and the disruption event information from a plurality of computerized data sources in real-time;
based on the supplier information and the supply chain disruption event information, determine a risk value that indicates a risk level of disruption of the operations of the first supplier based on the disruption event information;
flag the first supplier within the database of the plurality of suppliers in response to determining that the determined risk value is greater than a risk tolerance threshold;
notify, via the communications transceiver, the buyer that the first supplier has been flagged;
provide, via the communications transceiver, a list of recommended suppliers to the buyer via a graphical display device in response to determining that the determined risk value is greater than the risk tolerance threshold, wherein the recommended suppliers are each capable of providing a respective second product to the buyer, wherein each of the respective second products satisfies the criteria of the buyer; and
automatically solicit bids from one or more suppliers on the list of recommended suppliers in response to determining that the determined risk value is greater than the risk tolerance threshold.

13. The system of claim 12, wherein, to determine the risk value, the processor is further configured to:
receive the supply chain disruption event information from a plurality of sources that indicates that the supply chain disruption event occurred, and wherein the supply chain disruption event impacts an ability of the first supplier to provide the first product to the buyer on time;
assign each of the plurality of sources a weight corresponding to a reliability level of the respective source, wherein the reliability level indicates a reliability of the respective source to report accurate information; and
sum the weights of each of the plurality of sources, and wherein said flagging the first supplier is in response to determining that the sum of the weights of each of the plurality of sources is above a risk tolerance threshold.

14. The system of claim 12, wherein the memory is further configured to store a database of buyer preference information, a database of buyer-supplier association information, and transportation cost information, and wherein the processor is further configured to:
receive the buyer preference information;
receive the buyer-supplier association information, wherein the buyer-supplier information indicates relationships between the buyer and one or more of the potential suppliers;
receive the transportation cost information, wherein the transportation cost information indicates transportation costs of the respective second products from locations of the plurality of suppliers and a location of the buyer; and
determine a list of recommended suppliers based on the information, the buyer preference information, the buyer-supplier association information, and the transportation cost information, wherein the list of recommended suppliers comprises at least one supplier of the plurality of suppliers.

15. The system of claim 14, wherein, to determine the list of recommended suppliers, the processor is further configured to:
compare buyer preferences of the buyer preference information with respective supplier capabilities of the information to determine a plurality of difference scores;
determine a previous relationship score based on a previous relationship between the buyer and the first supplier indicated in the buyer-supplier association information;

determine a transportation cost score based on a cost to transport the respective second products from a location of the first supplier to the location of the buyer;

sum the plurality of difference scores, the previous relationship score, and the transportation cost score, wherein each of the plurality of difference scores, the previous relationship score, and the transportation cost score are weighted based on relevance to the buyer; and determine that the recommended suppliers are each capable of providing the respective second product to the buyer based on the sum of the plurality of difference scores for each of the suppliers.

16. The system of claim 12, wherein the memory is configured to store a database of feedback regarding the first supplier, and wherein the processor is further configured to:
receive the feedback, wherein the feedback was supplied by a plurality of buyers;
calculate a plurality of sub-scores based on the information and the feedback, wherein each sub-score relates to an aspect of the first supplier;
calculate an aggregate score based on the plurality of sub-scores, wherein each sub-score is weighted based on relevance of the respective aspect to one or more second buyers; and
rank the first supplier among the recommended suppliers based on the aggregate score.

17. The system of claim 12, further comprising a location sensor configured to:
determine a location of a shipment containing the first product; and
transmit, to the communications transceiver, the location of the shipment, wherein the disruption event information comprises the location of the shipment.

18. A non-transitory computer-readable medium including computer-readable instructions that, upon execution by a processor, cause a device to:
monitor supply chain disruption event information from a plurality of data sources in real-time, wherein to monitor the supply chain disruption event information the computer-readable instructions cause the device to receive information related to operations of a first supplier from the plurality of data sources, wherein the first supplier is responsible for providing a first product that satisfies criteria of a buyer;
based on the supply chain disruption event information, determine a risk value that indicates the risk of disruption of the operations of the first supplier;
flag the first supplier within a database of potential suppliers in response to determining that the determined risk value is greater than a risk tolerance threshold;
notify the first supplier that the first supplier has been flagged;
provide a list of recommended suppliers to the buyer on a graphical display device in response to determining that the determined risk value is greater than the risk tolerance threshold, wherein the recommended suppliers are each capable of providing a respective second product to the buyer, wherein each of the respective second products satisfy the criteria of the buyer and;
automatically solicit bids from one or more suppliers on the list of recommended suppliers in response to determining that the determined risk value is greater than the risk tolerance threshold.

19. The non-transitory computer-readable medium of claim 18, wherein the instructions further cause the device to:
receive buyer preference information;
receive buyer-supplier association information that indicates relationships between the buyer and the potential suppliers;
receive transportation cost information that indicates transportation costs of the respective second products from locations of the potential suppliers and a location of the buyer; and
determine a list of recommended suppliers based on the information, the buyer preference information, the buyer-supplier association information, and the transportation cost information, wherein the list of recommended suppliers comprises at least one supplier of the potential suppliers.

20. The non-transitory computer-readable medium of claim 18, wherein the instructions further cause the device to:
receive feedback regarding the first supplier, wherein the feedback was received from a plurality of buyers;
calculate a plurality of sub-scores based on the information and the feedback, wherein each sub-score relates to an aspect of the first supplier;
calculate an aggregate score based on the plurality of sub-scores, wherein each sub-score is weighted based on relevance of the respective aspect to one or more second buyers; and
rank the first supplier among the recommended suppliers based on the aggregate score.

\* \* \* \* \*